United States Patent
Camp

(10) Patent No.: US 9,612,978 B2
(45) Date of Patent: Apr. 4, 2017

(54) ENCRYPTED FLASH-BASED DATA STORAGE SYSTEM WITH CONFIDENTIALITY MODE

(71) Applicant: International Business Machines Corporation, Armonk, NY (US)

(72) Inventor: Charles J. Camp, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 14/016,087

(22) Filed: Aug. 31, 2013

(65) Prior Publication Data

US 2014/0181532 A1    Jun. 26, 2014

Related U.S. Application Data

(63) Continuation-in-part of application No. 13/595,476, filed on Aug. 27, 2012, now Pat. No. 8,713,245, which is a continuation of application No. 13/335,930, filed on Dec. 22, 2011, now Pat. No. 8,255,620.

(60) Provisional application No. 61/696,131, filed on Aug. 31, 2012, provisional application No. 61/429,113, filed on Dec. 31, 2010.

(51) Int. Cl.
| | |
|---|---|
| *G06F 12/00* | (2006.01) |
| *G06F 12/14* | (2006.01) |
| *G06F 11/10* | (2006.01) |
| *G06F 11/14* | (2006.01) |
| *G06F 11/16* | (2006.01) |
| *G06F 21/79* | (2013.01) |

(52) U.S. Cl.
CPC ...... *G06F 12/1408* (2013.01); *G06F 11/1068* (2013.01); *G06F 11/1441* (2013.01); *G06F 11/1666* (2013.01); *G06F 21/79* (2013.01); *G06F 2221/2107* (2013.01)

(58) Field of Classification Search
CPC ............. G06F 12/1408; G06F 11/1068; G06F 11/1441; G06F 21/79; G06F 2221/2107
USPC ....................................................... 711/103
See application file for complete search history.

(56) References Cited

U.S. PATENT DOCUMENTS

| | | |
|---|---|---|
| 6,457,126 B1 | 9/2002 | Nakamura et al. |
| 6,928,551 B1 | 8/2005 | Lee et al. |
| 7,647,557 B2 | 1/2010 | Janus |
| 7,716,389 B1 | 5/2010 | Bruce et al. |
| 7,954,092 B2 | 5/2011 | Sharma et al. |

(Continued)

*Primary Examiner* — Matthew Bradley
(74) *Attorney, Agent, or Firm* — Locke Lord LLP

(57) ABSTRACT

Raw or unencrypted data is encrypted using a standard encryption algorithm and stored in a Flash memory array. The raw or unencrypted data may be pre-processed before it is encrypted. Pre-processing may include data scrambling, pre-encryption data mixing, or both. Data scrambling may involve an invertible transformation. The scrambled data may then be used to seed a sequence generator. Each output from the sequence generator may be processed using a bit-by-bit Exclusive Or (XOR) operation to impart random or pseudorandom statistical properties. Pre-encryption data mixing may combine the scrambled (or unscrambled) data with information that is unique to each chunk of data, as well as with a user-supplied secret key. This helps ensure that identical raw data chunks are not stored as identical encrypted data chunks in the Flash memory array.

20 Claims, 19 Drawing Sheets

(56) References Cited

U.S. PATENT DOCUMENTS

2004/0205352 A1    10/2004   Ohyama
2011/0295969 A1    12/2011   Bernstein et al.
2012/0166715 A1*   6/2012   Frost .................. G06F 11/1068
                                                 711/103

\* cited by examiner

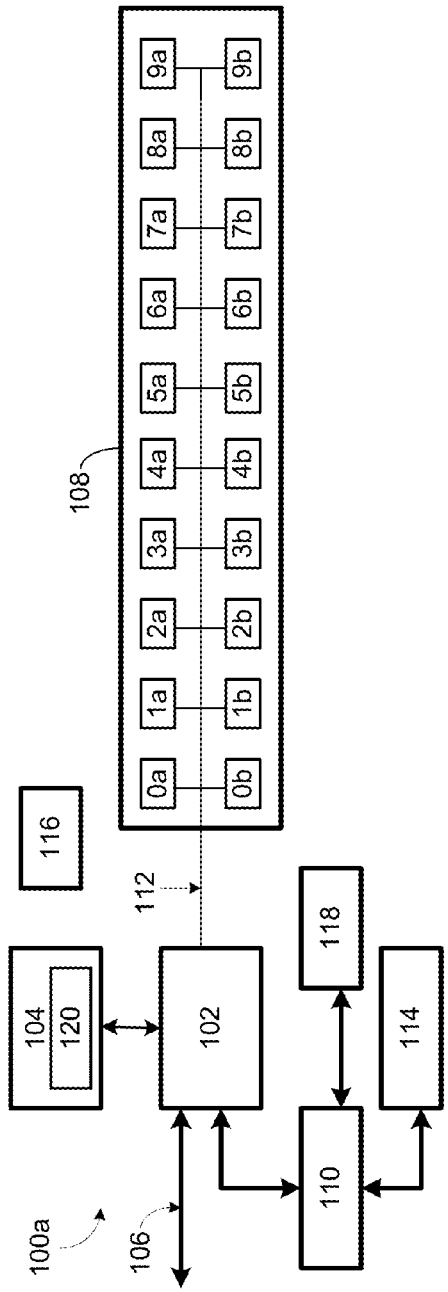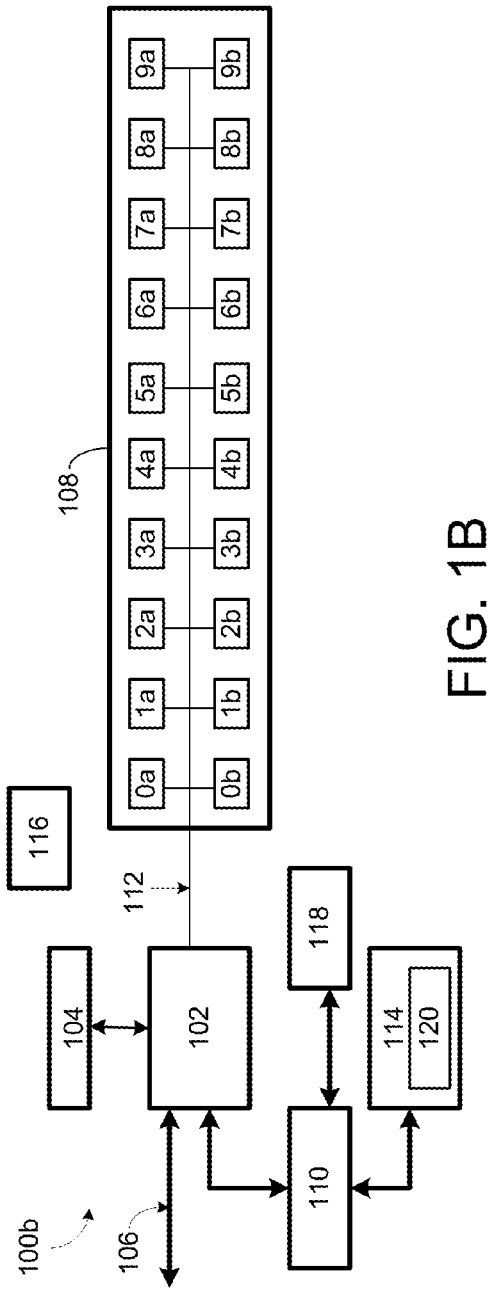

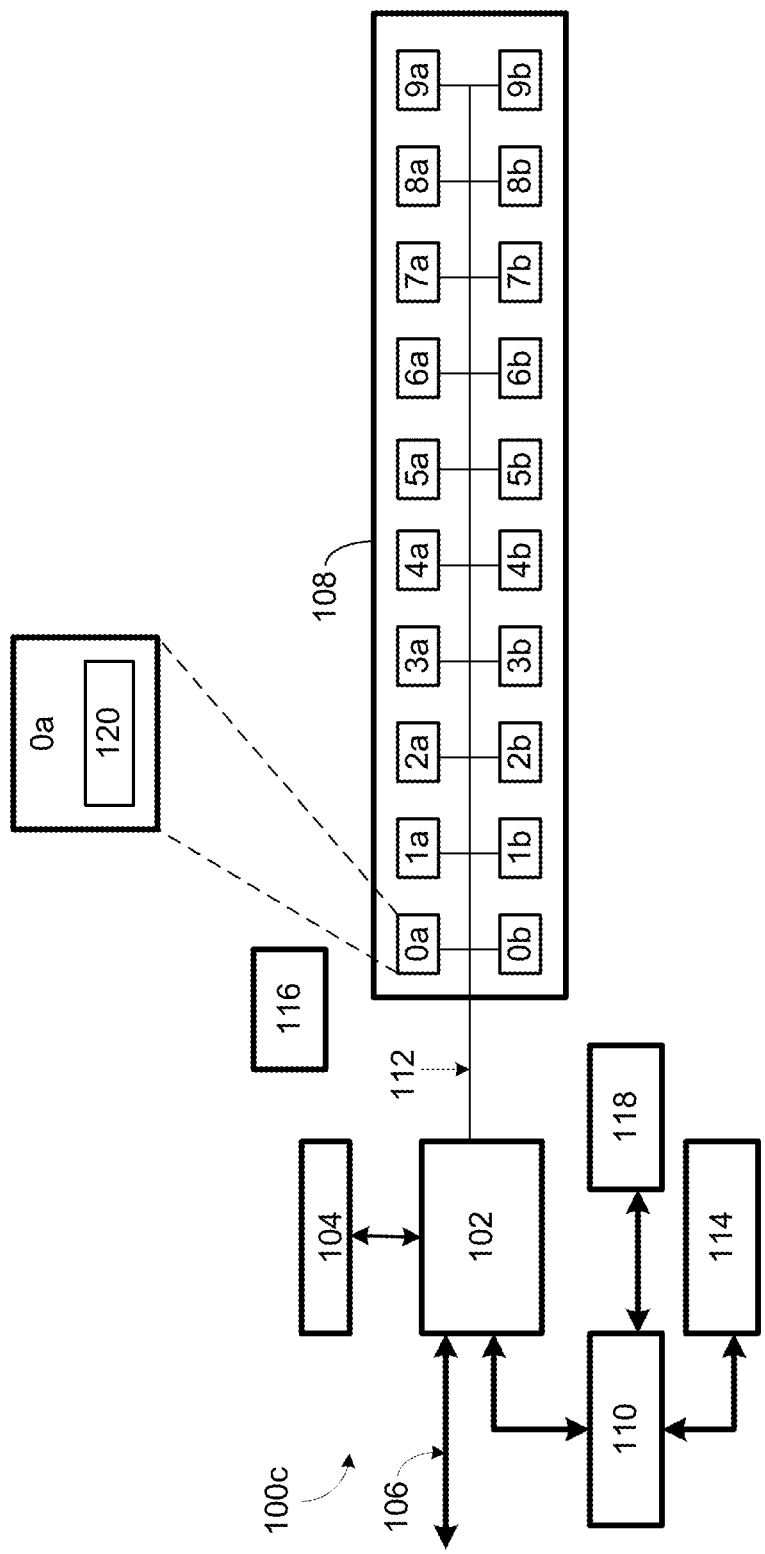

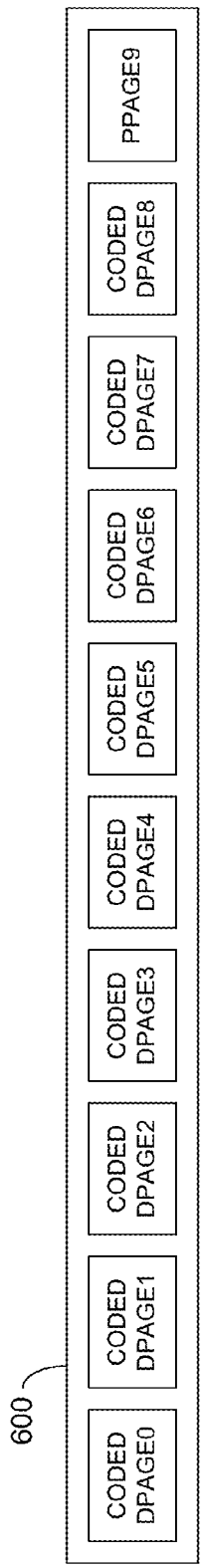
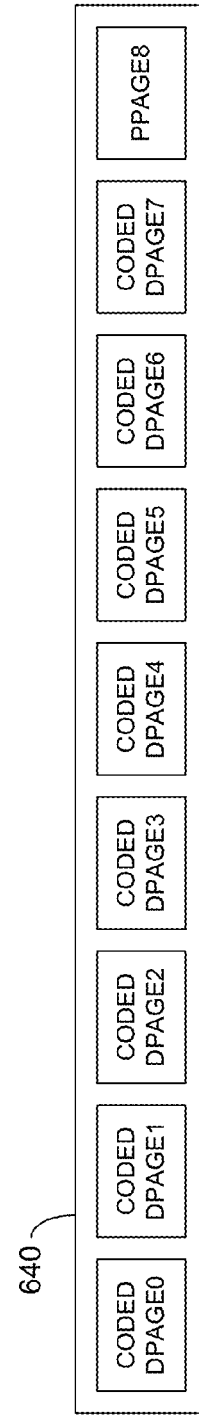
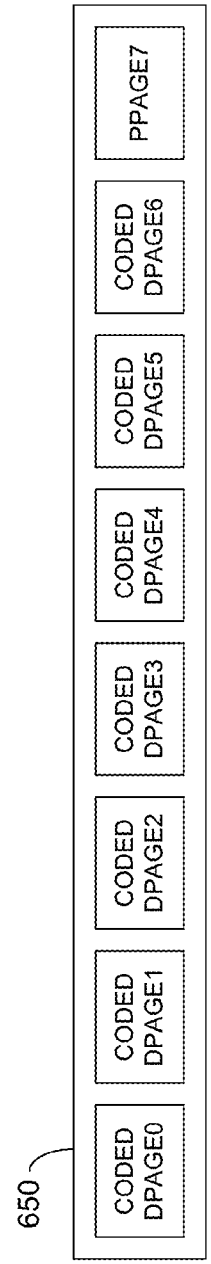
FIG. 6A
FIG. 6B
FIG. 6C

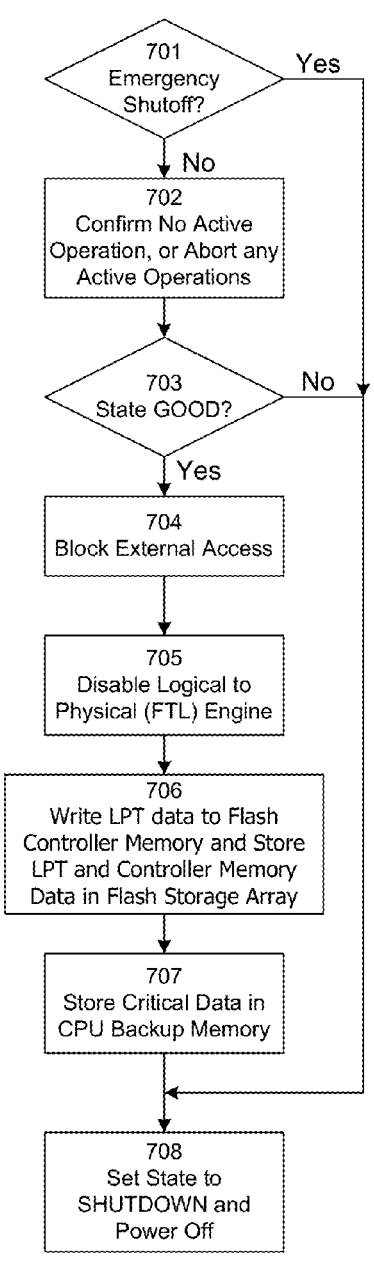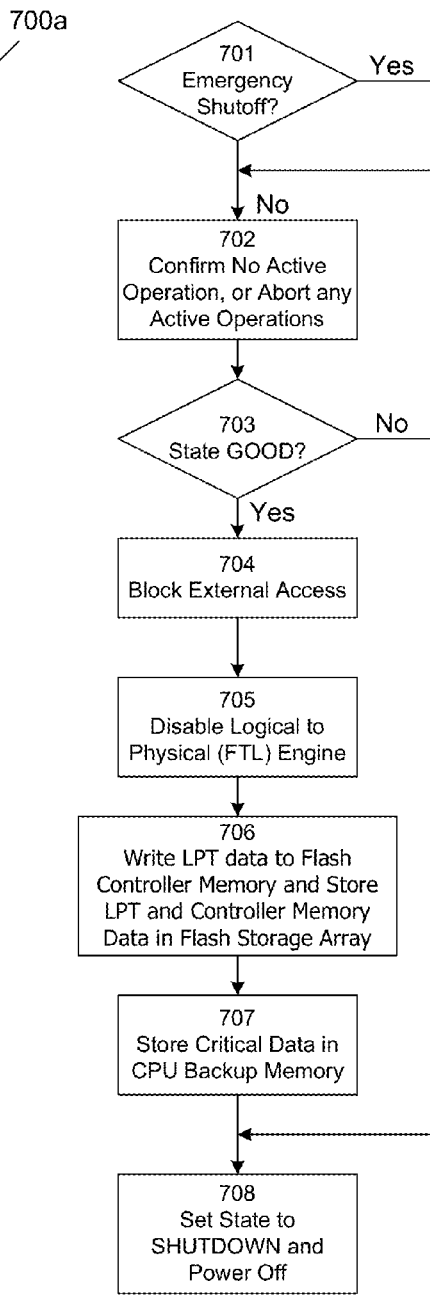
FIG. 7A
FIG. 7B

ENCRYPTED FLASH-BASED DATA STORAGE SYSTEM WITH CONFIDENTIALITY MODE

CROSS REFERENCE TO RELATED APPLICATIONS

This application for patent claims the benefit of priority to U.S. Provisional Application Ser. No. 61/696,131, entitled "Encrypted Flash-Based Data Storage System with Confidentiality Mode," filed Aug. 31, 2012; and is a continuation-in-part of U.S. Non-Provisional application Ser. No. 13/595,476 entitled "Secure Flash-Based Memory System with Fast Wipe Feature," filed Aug. 27, 2012; which is a continuation of U.S. Non-Provisional application Ser. No. 13/335,930 entitled "Secure Flash-Based Memory System with Fast Wipe Feature," filed Dec. 22, 2011, which claims the benefit of priority to U.S. Provisional Application Ser. No. 61/429,113, entitled "Secure Flash-Based Memory System with Fast Wipe Feature," filed Dec. 31, 2010; the foregoing applications being incorporated herein by reference in their entireties.

STATEMENT REGARDING FEDERALLY SPONSORED RESEARCH

Not applicable.

REFERENCE TO APPENDIX

Not applicable.

BACKGROUND OF THE INVENTION

Field of the Invention

This disclosure relates generally to methods and apparatuses for protecting data in a data storage system. More specifically, this application relates to a Flash memory data storage system and method therefor that can encrypt the data stored on the system as well as eliminate or minimize any correlations that may be drawn from the encrypted data.

Description of the Related Art

One way to improve the security of a data storage system and prevent theft of data is to encrypt the data stored on the data storage system. Any number of data encryption techniques known to those having ordinary skill in the art may be used, including AES, DES, RCS, Blowfish, IDEA, NewDES, SAFER, CAST5, FEAL, and the like. Once encrypted, even if the data storage system is stolen or somehow falls into the wrong hands, an unauthorized user will be unable to make any meaningful use of the stored data without the encryption key that was used to perform the encryption.

In many data storage systems, encryption is performed automatically by a software program installed and executed on the host system. The software program encrypts the data sent to the data storage system and subsequently decrypts the data received from the data storage system. The encryption and decryption may also be performed by the data storage system itself through dedicated system hardware specifically designed for that purpose. Alternatively, system hardware may be custom coded or programmed to perform the encryption and decryption.

Software-based encryption and hardware-based encryption each have their advantages and benefits. Software-based encryption is easier to implement, but is generally slower because the extra layer of software can slow down the host system. Hardware-based encryption is generally faster, but may be more expensive to implement, maintain, and upgrade. But hardware-based encryption is also generally considered to be more difficult for unauthorized users to bypass or overcome.

The encryption itself can be implemented using one of several modes of operation, or procedures, for enabling the repeated and secure use of a block cipher, which is an encryption algorithm that uses a single encryption key. The simplest of the encryption modes is the electronic codebook (ECB) mode. In ECB mode, a message is divided into blocks and each block is encrypted separately. Typically, the last block in a message is padded so that it has the same length as the other blocks.

While ECB mode is relatively easy to implement, a disadvantage is that it does not hide repetitions or patterns within the data well. In ECB mode, identical plaintext blocks are encrypted into identical ciphertext blocks. Thus, although the encrypted data itself is not discernible, it is possible to determine whether a given block of encrypted data is the same as another block of encrypted data. Therefore, patterns or repetitions that may exist in the data, such as a string of 0's to indicate the beginning of a file, could be correlated. This is commonly referred to as loss or lack of "confidentiality."

Accordingly, what is needed is an improved method and system for encrypting data in a Flash-based data storage system that is capable of storing and encrypting data without losing or compromising confidentiality.

SUMMARY OF THE INVENTION

The disclosed embodiments address the loss of confidentiality problem described above as well as other problems. In general, in accordance with the disclosed embodiments, raw or unencrypted user data (i.e., application data) to be written to a Flash memory array is divided into chunks (e.g., 128 bits) and then encrypted using any suitable industry standard encryption algorithm, such as the AES-128 encryption algorithm, and a user-supplied secret encryption key (i.e., a 128-bit encryption key). The encrypted data produced by the AES-128 algorithm is then stored in the Flash memory array.

In some embodiments, the raw or unencrypted user data (plaintext) may be provided directly to the AES encryption algorithm, or it may be pre-processed first before it is encrypted. Pre-processing may include data scrambling, pre-encryption data mixing, or both. Data scrambling may involve an invertible transformation that first maps each set of auxiliary data to a new set of auxiliary data having pseudorandom statistical properties. The new auxiliary data may then be used to seed a sequence generator that is incremented throughout the corresponding sector of user data. Each output from the sequence generator may be processed using a bit-by-bit Exclusive Or (XOR) operation with a word (two bytes) or other predefined length of user data to impart pseudorandom statistical properties to the auxiliary data as well as the user data. Pre-encryption data mixing may combine the scrambled (or unscrambled) auxiliary data with information that is unique to each encryption chunk (e.g., sub-page, sector, and chunk number or index), as well as with a user-supplied 128-bit secret number used only once ("nonce"). This helps ensure that identical plaintext (raw) data chunks are not mapped to identical ciphertext (encrypted) data chunks by the encryption process.

User data retrieved from the Flash memory array is decrypted in chunks of 128 bits using the same industry standard AES-128 algorithm with the same user-supplied 128-bit secret key. The decrypted data vector produced by the AES-128 algorithm may then be returned directly to the user or host application, or it may be post-processed before being returned. Post-processing may consist of post-decryption data mixing, data unscrambling, or both. Data mixing and data unscrambling undo the complementary operation from the data encryption process. Each of these operations is only performed if the complementary operation was enabled during the encryption process.

In general, in one aspect, the disclosed embodiments are directed to a method of preserving confidentiality in a Flash-based storage system. The method comprises receiving data from an external host to be written to the Flash-based storage system, and writing the data to a plurality of Flash memory chips in the Flash-based storage system, the data being written to the Flash memory chips in the form of page stripes, each page stripe comprising a number of data pages, each data page of a page stripe being written to a different Flash memory chip from other data pages of the page stripe. The method further comprises mixing the data pages of the page stripe being written to the Flash memory chips, the mixing comprising performing a mathematical and/or logical operation on the data pages so that identical data pages appear different from one another after encryption, and encrypting the mixed data pages of the page stripe being written to the Flash memory chips.

In general, in another aspect, the disclosed embodiments are directed to a computer-readable medium having computer-readable instructions stored thereon for causing a Flash controller to preserve confidentiality in a Flash-based storage system. The computer-readable instructions comprise instructions for causing the Flash controller to receive data from an external host for storing in the Flash-based storage system, and write the data to a plurality of Flash memory chips in the Flash-based storage system in the form of page stripes, each page stripe comprising a number of data pages, each data page of a page stripe being written to a different Flash memory chip from other data pages of the page stripe. The computer-readable instructions further comprise instructions for causing the Flash controller to mix the data pages of the page stripe being written to the Flash memory chips, the mixing comprising performing a mathematical and/or logical operation on the data pages so that identical data pages appear different from one another after encryption, and encrypt the mixed data pages of the page stripe being written to the Flash memory chips.

In general, in yet another aspect, the disclosed embodiments are directed to a system controller for a Flash memory storage system. The system controller comprises a nonvolatile memory and programmable circuitry connected to the nonvolatile memory. The programmable circuitry may be programmed to receive data from an external host for storing in the Flash-based storage system, and write the data to a plurality of Flash memory chips in the Flash-based storage system in the form of page stripes, each page stripe comprising a number of data pages, each data page of a page stripe being written to a different Flash memory chip from other data pages of the page stripe. The programmable circuitry may be further programmed to mix the data pages of the page stripe being written to the Flash memory chips, the mixing comprising performing a mathematical and/or logical operation on the data pages so that identical data pages appear different from one another after encryption, and encrypt the mixed data pages of the page stripe being written to the Flash memory chips.

BRIEF DESCRIPTION OF THE DRAWINGS

The foregoing and other advantages of the disclosed embodiments will become apparent from the following detailed description and upon reference to the drawings, wherein:

FIGS. 1A-1C illustrate an exemplary Flash memory storage system in accordance with the disclosed embodiments;

FIGS. 6A-6F illustrate exemplary Data Pages for a Flash memory storage system in accordance with the disclosed embodiments;

FIGS. 7A and 7B illustrate exemplary flowcharts for initiating an emergency shutdown of a Flash memory storage system in accordance with the disclosed embodiments;

DETAILED DESCRIPTION

Figure 2:
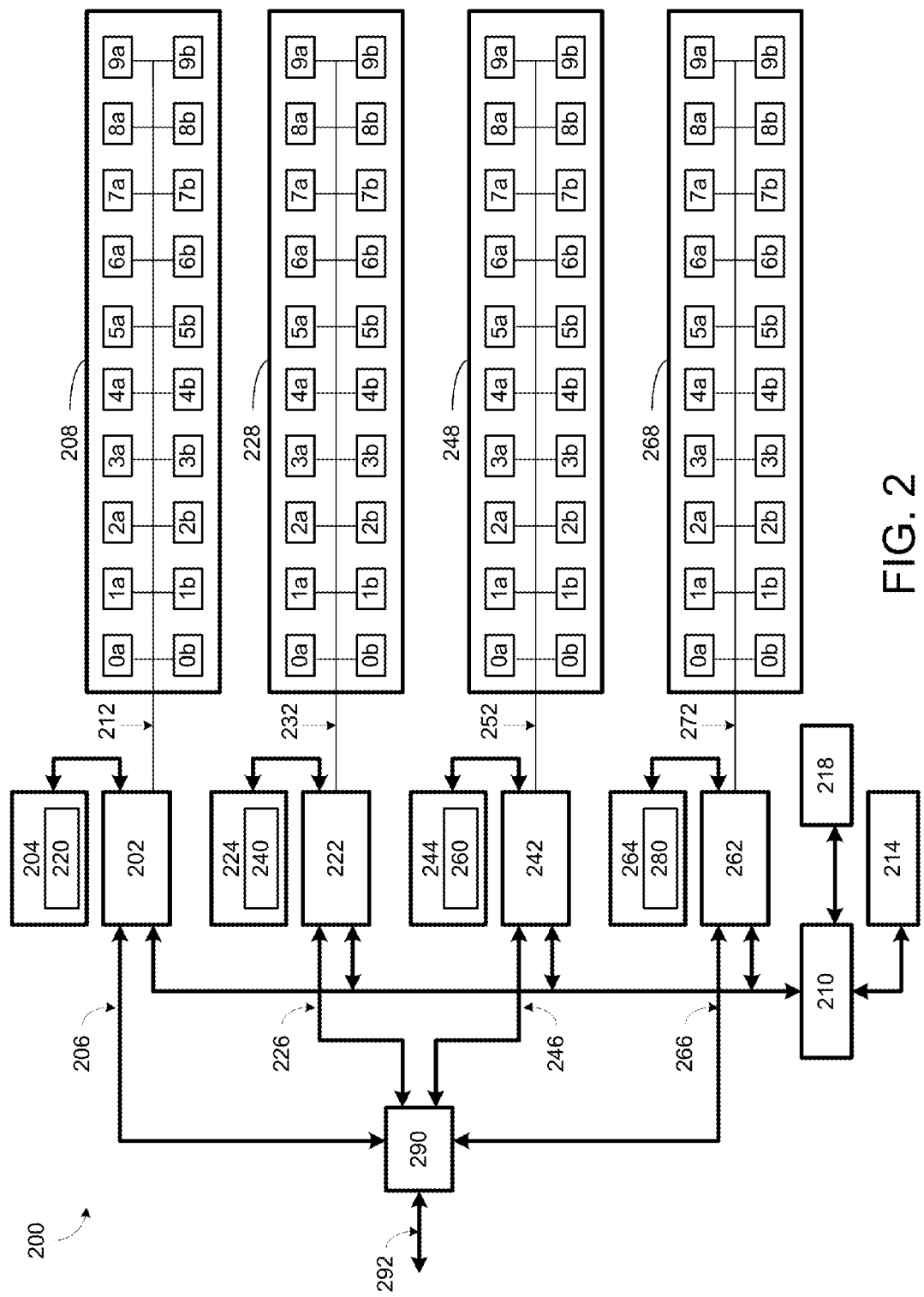
FIG. 2 illustrates an example of a card-based Flash memory storage system in accordance with the disclosed embodiments.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions disclosed herein are described or shown for the sake of clarity and understanding. Persons of skill in this art will also appreciate that the development of an actual commercial embodiment incorporating aspects of the disclosed inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location, and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the invention or the appended claims.

Turning to the drawings and, in particular, to FIGS. 1A-1C, exemplary Flash memory storage systems in accordance with certain teachings of the present disclosure are illustrated. While they can be constructed in various ways, the Flash memory storage systems exemplified in FIGS. 1A-1C are each constructed on a single multi-layer printed circuit board.

Referring first to FIG. 1A, an exemplary illustrated Flash memory storage system 100a includes a Flash controller 102, Flash controller memory 104, an external communication bus 106 used to communicate information to the Flash controller 102, a Flash memory array 108, a CPU 110, an internal communication bus 112 that enables communications between the Flash controller 102 and the Flash memory array 108, and a CPU memory 114. In the illustrated example, the various components of the Flash memory storage system 100a are mounted to the same printed circuit board. Such mounting may be accomplished through, for example, surface mounting techniques, through-hole techniques, through the use of sockets and socket-mounts and/or other mounting techniques.

The Flash controller 102 may take many forms. In the example of FIG. 1A, the Flash controller 102 is a field programmable gate array (FPGA) that, during start-up of the system, is programmed automatically with a program stored in nonvolatile memory within Flash controller 102. Although the FPGA programs itself automatically during system start-up, it may also be configured by the CPU 110 in some embodiments.

Like the Flash controller 102, the Flash controller memory 104 may take many forms. In the exemplary embodiment of FIG. 1A, the Flash controller memory 104 takes the form of random access memory and in particular DDR2 RAM memory. Such RAM memory is an example of "volatile" memory, or memory that requires a source of power to maintain the integrity of the information stored within the memory.

The Flash memory array 108 may similarly take many forms. In the illustrated example, the Flash memory array 108 is formed from twenty individually addressable Flash memory storage devices divided into groups of two (0a, 0b), (1a, 1b), (2a, 2b), through (9a, 9b). In this example, each of the Flash memory storage devices 0a-9b may take the form of a board-mounted Flash memory chip, such as, for example, a 64 Gigabit (Gb) Single Level Cell (SLC) NAND Flash memory chip.

The communication bus 106 may be any acceptable data bus for communicating memory access requests between a host device (such as a personal computer, a router, etc.) and the Flash memory storage system 100a. The communication bus 106 may also use any acceptable data communication protocols.

The internal communication bus 112 may take any form that enables the communications described herein. In the example of FIG. 1A, the internal communication bus 112 is formed from ten individual 8-bit communication buses 0-9 (not individually illustrated), each arranged to enable communication between the Flash controller 102 and each of the groups of two memory storage devices 0a-9b. Thus, for example, the first internal communication bus 0 enables communication between the Flash controller 102 and the first pair of memory devices 0a and 0b, the fifth internal communication bus 4 enables communication between the Flash controller 102 and the fifth pair of memory devices 4a and 4b, and so on.

In general operation, the Flash controller 102 receives requests via the communication bus 106 to read data stored in the Flash memory array 108 and/or to store data in the Flash memory array 108. The Flash controller 102 responds to these requests either by accessing the Flash memory array 108 to read or write the requested data from or into the Flash memory array 108 in accordance with the received request, by accessing a memory cache (not illustrated) associated with the Flash memory array 108, or by performing a read or write operation.

In some embodiments, an on-board ultra-capacitor 116 may also be provided and configured to receive charge during intervals when power is supplied to the Flash memory storage system 100a and to provide power for a limited time to the components making up the Flash memory storage system 100a when applied power is removed or drops below the power level provided by such ultra-capacitor 116. The purpose of the ultra-capacitor 116 is to provide power for limited operation of the Flash memory storage system 100a upon failure of power to the system. In the event of a power loss, the ultra-capacitor 116 automatically engages and provides power to most or all components of the Flash memory storage system 100a. In the Flash storage system of FIG. 1A, the ultra-capacitor 116 is sized to provide adequate power to allow the system enough time to store in the Flash memory array 108 any data that may be present in the volatile (RAM) Flash controller memory 104 at the time of power loss or power failure, as well as any other information that may be necessary or useful for proper board operation. In that regard, the overall Flash storage system 100a acts as a non-volatile memory system, even though it utilizes various volatile memory components. Alternative embodiments are envisioned where multiple ultra-capacitors 116 at various distributed locations across the printed circuit board and/or a bank of ultra-capacitors 116 is used to provide the described back-up power. As used herein, the term ultra-capacitor may be any capacitor with sufficiently high capacitance to provide the back-up power required to perform the functions described above and that is dimensioned to fit on a printed circuit board and be used in a system, such as system 100a.

In some embodiments, a CPU backup memory space 118 may also be provided for the CPU 110. This CPU backup memory space 118 may be accessed by the CPU 110 through a dedicated communications link, or it may be accessed by the CPU 110 using the same communications bus that the CPU 110 uses to access the main CPU memory 114, or the same communications bus that the CPU 110 uses to access the Flash controller 102. In some embodiments, the CPU backup memory space 118 is formed from highly stable non-volatile storage, such as NOR Flash memory. Such a CPU backup memory space 118 may then be used to store information that is important for purposes of backing up and restoring the data on the Flash memory storage system 100a.

The system 100a uses an addressing scheme to allow the Flash controller 102 to access specific memory locations within the Flash memory array 108. For purposes of explanation, this addressing scheme will be discussed in the context of a WRITE request, although it will be understood that the same addressing scheme can be and is used for other requests, such as READ requests.

In general, the Flash controller 102 will receive a WRITE request from a host device that contains: (i) data to be stored in the memory system 100, and (ii) an indication of the memory address where the host device would like for the data to be stored. The WRITE request may also include an indication of the amount (or size) of the data to be transferred. In one embodiment, the system is constructed such that the amount of data (or the size of each WRITE request) is fixed at the size of a single Flash memory page. In the exemplary embodiment of FIG. 1A, this corresponds to 4 KB (Kilobytes) of information. In such an embodiment, the address provided by the host device may correspond to the address of a Page within a logical address space.

In the system 100a of FIG. 1A, the address received by the Flash controller 102 from the host device does not refer to an actual physical location, called a Physical Block Address (or "PBA"), within the Flash memory array 108. Instead, the address received by the Flash controller 102 is a Logical Block Address (or "LBA") that refers to a logical address, rather than to any specific physical location within the Flash memory array 108. A Logical-to-Physical conversion table (or "LPT") is then used to associate each LBA provided by the host device with the actual physical location at which the data corresponding to each LBA is stored. The Flash controller 102 then updates and maintains the LPT as needed.

Although the term "block address" is used in PBA and LBA, it should be noted that this block address refers to a "page" of data, which is the smallest individually addressable data unit within the Flash memory array 108. In the exemplary system 100a, each page of data has a specific length, which may be 4 KB of data in some embodiment, plus a predetermined number of additional or spare bytes of data in some embodiments (e.g., 128 bytes, 64 bytes, etc.) that may be used by the end application as needed for a particular purpose. In the embodiment of FIG. 1A, data is written into or read from the Flash memory array 108 on a page-by-page basis. A "block," on the other hand, is a collection of pages that are associated with one another, typically in a physical manner. The physical association is typically such that the "block" is the smallest collection of Flash memory locations within the Flash memory array 108 that may be erased at one time. In the exemplary system 100a, each block includes 64 pages of data.

Several pages may be associated with one another to form a "page stripe" composed of data pages and at least one data protection page. The data pages contain data, while the data protection page contains error correction information that may be used to reconstruct the data in the data pages of a given page stripe. The data protection page typically includes a bit-by-bit Exclusive Or (XOR) of the data pages in the page stripe, an XOR of the LBA information for the data pages in the page stripe, CRC information for the data protection page, and ECC information for the data protection page.

In accordance with the disclosed embodiments, the Flash storage system 100a may include a user key 120 for encrypting data stored or written to the system, and for subsequently decrypting data retrieved or read from the system. In certain data storage applications that involve confidential or highly sensitive data, such encryption can help stop or at least impede an unauthorized person from making meaningful use of the data stored in the system. Circumstances where such security may be desirable include, but are not limited to, covert operations by various intelligence gathering agencies of the United States (e.g., Central Intelligence Agency (CIA), National Security Agency (NSA), Military Intelligence, etc.). Consider an airborne surveillance operation of the type mentioned above, but where the surveillance is conducted secretly over hostile or enemy territory. It would be disastrous for the United States politically and/or militarily if the personnel conducting the surveillance were captured by hostile forces, such as Al Qaeda, the Taliban, Iran, or North Korea, and the surveillance data subsequently surrendered into enemy hands. In such a situation, it is critical that any unauthorized access and use of the surveillance data be quickly and immediately thwarted, as U.S. national security interests may be adversely affected.

One option for preventing unauthorized access and use of the data in a Flash storage system is to erase or "wipe" the data from the system. This option involves the Flash storage system performing an ERASE operation on the data, or at least the highly-sensitive portions of the data, upon assertion of an appropriate command or signal by the user. However, a typical ERASE operation for industry standard SLC or MLC Flash memory can consume a significant amount of time—time that could allow enemy personnel to cut power to the system or otherwise interfere with the erase operation. Thus, while an ERASE operation may be an acceptable option in less time-sensitive situations, in scenarios like the one described above, there may not be enough time for the Flash storage system to complete the ERASE operation.

As an alternative to erasing the data, such data (or at least the highly-sensitive portions thereof) may instead be rendered indecipherable or otherwise unusable. This task may be accomplished, for example, by encrypting each page of data prior to storing it in the Flash memory array so that the data is incomprehensible to anyone without the ability to decrypt it. Any number of data encryption techniques known to those having ordinary skill in the art may be used, such as AES, DES, RC5, Blowfish, IDEA, NewDES, SAFER, CAST5, FEAL, and the like.

In some embodiments, the encryption technique may be as simple as 1) shuffling or reordering the data pages, and 2) scrambling each data page by selectively inverting various data bits within each shuffled data page. The sequences of information which define the data shuffling and selective inversion operations are referred to herein, respectively, as the data shuffling and data scrambling sequences. In a preferred embodiment, for example, each page of raw or unencrypted data is temporarily stored in an addressable memory buffer within the Flash memory controller before being transferred into Flash memory. By addressing this temporary memory buffer linearly when storing the data to the buffer, then nonlinearly (i.e., according to the shuffling sequence) when retrieving the data from the buffer, the raw data is effectively "shuffled." In a preferred embodiment, selective data inversion is achieved by performing a logical XOR of the shuffled data with the desired scrambling sequence. This process has an advantage in that each data page may be encrypted and decrypted using readily available hardware and software resources. Furthermore, the same hardware and/or software resources may be used in both directions (decryption as well as encryption). Without knowledge of both the shuffling and scrambling sequences, however, it would be extremely difficult to reverse the encryption process and restore the original page of raw data.

The data scrambling and data shuffling sequences (or strings of numbers), in general, may differ for each regular data page to be encrypted, and may be generated using any well-defined and stable functions (i.e., functions that, for a given set of inputs, return a specific and finite output corresponding to the inputs). For example, AES or any of the other well-known data encryption algorithms may be used to generate the data scrambling sequence and/or data shuffling sequence. The functions used to produce the data shuffling sequence and the data scrambling sequence, hereafter referred to as sequence generator functions, may depend upon a single input, or they may use multiple inputs to generate each shuffling and scrambling sequence. In the latter case, all of the same inputs would be needed by the sequence generator functions to produce the correct deshuffling and descrambling sequences. These multiple inputs may include, for example, a user input as well as one or more system-based inputs. Such sequence generator functions preferably produce a scrambling sequence with pseudo-random statistical properties and length equal to that of a regular data page (i.e., 4 KB). A smaller or larger scrambling sequence may also be generated which, in some cases, may be padded with dummy data or truncated as needed. Similarly, it is desirable for the sequence generator functions to produce a shuffling sequence that maps each regular data page into a shuffled data page of the same size. While it is possible for the shuffled data page to be larger in size than the regular data page, such a condition generally requires greater bandwidth and storage capacity than would otherwise be necessary.

In the disclosed Flash storage systems, the one or more system-based inputs may be any input that is automatically generated by the system, either as part of the system's normal operation, or specifically for use as an input to the shuffling and scrambling sequence generator functions. For example, the system-based input may be the logical block address (LBA), which is the unique logical address for a specific page, that typically accompanies a READ or WRITE operation for a particular data page. Other implementations may use the physical block address (PBA) normally associated with the READ or WRITE operation as the system-based input. Still other implementations may use both the LBA and the PBA as the system-based inputs. Other types of system-based inputs may also be used without departing from the scope of the disclosed embodiments.

As for the user input, also called a user key, this input may be any numeric or alphanumeric string of a predefined length (e.g., 102 characters, 20 characters, etc.) that may be selected by an operator. It is also possible, of course, for the user key to be generated automatically using well-known key generation algorithms (e.g., RSA, SHA-1, etc.), which may make it easier to generate multiple user keys at a time and/or on a regular basis (e.g., daily, weekly, monthly, etc.) depending on the specific implementation. Such a user key may then be provided to the Flash storage system via manual keyboard entry by the operator, inputted to the system from an external source (e.g., diskette, CD, memory card, USB key drive, network server, etc.), or some other electronic upload method known to those having ordinary skill in the art. Additionally, it may be desirable to employ multiple user keys that are provided by different individuals to eliminate the risk that a single user may be coerced or otherwise persuaded into divulging the key. Consider again the case of an aerial surveillance operation over hostile territory. If knowledge of the user key depends, at least in part, upon a user not physically present during the operation, then it is highly unlikely that the entire user key can be recovered by a hostile party.

A new user key may be provided each time the Flash storage system is powered up, or the same user key may be retained for some predefined period of time (e.g., days, weeks, months, etc.). The user key may then be used by the Flash storage system along with the one or more system-based inputs (in some embodiments) to encrypt and decrypt the data stored in the Flash memory array. And because the user key and the system-based inputs are all required to decrypt the data, any one of the inputs, say, the user key, may be deleted or destroyed to render the data unusable. Thus, a backup copy of the user key should be kept in a safe and secure location to guard against accidental or unintentional deletion or destruction of the key.

Where the user key alone is used to encrypt the data, one or more of the system-based inputs (e.g., LBA, PBA, etc.) may be encrypted with the page of data and stored together in the Flash memory array. When the page of data is later decrypted, the one or more system-based inputs are also decrypted. This allows the one or more system-based inputs to be immediately available for use by the system. Such an arrangement may be particularly useful in a power failure recovery situation where critical system data (e.g., the LPT, etc.) is lost. In that case, the one or more system-based inputs may allow the critical system data to be reconstructed, or may help it be reconstructed more quickly.

As can readily be seen, the disclosed embodiments make it extremely difficult for unauthorized personnel to access and use the data in the Flash storage system in any meaningful manner. In particular, when a situation arises like the one described above where capture of the Flash storage system is imminent, an operator may simply delete or otherwise destroy the user key to prevent decryption of the data in the system. Exemplary techniques for quickly deleting or destroying the user key are discussed further below. In some embodiments, specifically those in which the encryption algorithm is also secret, it may also be desirable to delete algorithm implementation information as well as, or instead of, the user key to foil any decryption. This implementation information may be compiled software instructions, FPGA configuration files, or any other information that is used in the encryption of raw user data (i.e., application data). In the embodiment described earlier, a user key and optional system-based information are utilized to produce data shuffling and data scrambling sequences. If the sequence generation functions are secret, then it may be desirable to destroy the sequence generation function along with the user key. Still other embodiments are envisioned where information related to the system-based inputs, such as the LPT, may be deleted as an additional measure to prevent the data from being decrypted (or at least make it more difficult to do so).

In accordance with the disclosed embodiments, as mentioned above, the Flash storage system 100a may include a user key 120 for encrypting data stored or written to the system, and for subsequently decrypting data retrieved or read from the system. In the illustrated example, the user key 120 is stored in the Flash controller memory 104 of the Flash controller 102. Recall from the description above that the Flash controller memory 104 is typically implemented as volatile memory (RAM), which is a type of memory that cannot retain the information stored in the memory after power is removed.

Storing the user key in volatile memory allows an operator to quickly flush the key simply by removing power from the volatile memory. However, for Flash storage systems that have backup power supplies like those disclosed herein, simply cutting the power to the system may not be enough. Care should also be taken to ensure that the backup power supply does not unintentionally maintain power to the system (e.g., for backing up system critical data) and, hence, to the volatile memory. Accordingly, as will be explained further below, one way to quickly remove power from the Flash storage system of the disclosed embodiments is to initiate an emergency shutdown rather than an orderly shutdown that may require more time to complete.

FIG. 1B illustrates an alternative embodiment of the Flash storage system 100*b* where the user key 120 is stored in the CPU memory 114 of the CPU 110. The CPU memory 114, like the controller memory 104, is typically implemented as volatile RAM memory and therefore loses all of the information stored therein upon removal of power. Thus, storing the user key in the CPU memory 114 also allows the key to be quickly flushed simply by removing power from the system.

In the alternative implementation of FIG. 1C, a Flash storage system 100*c* may store the user key 120 in the non-volatile Flash memory array 108 instead of the volatile RAM memory. More specifically, the user key 120 may be stored in a designated page in one of the Flash memory chips, for example, chip "0a" in the figures. Then, when an emergency situation like the one described above arises, only the block containing the designated page with the user key 120 needs to be erased and not the entire Flash memory array 108 (recall that a block is the smallest unit of Flash memory that may be erased at a time). As an alternative, instead of erasing the user key 120 from the Flash memory array 108, it may also be possible to destroy the user key by writing dummy or other data to the page where the user key 120 is stored. A benefit of this latter approach is that only the page containing the user key 120 needs to be overwritten and not the entire block. Thus, depending on the particular implementation, either a single page or a single block may be implicated, but not the entire Flash memory array 108, thereby providing a significant reduction in the amount of time required to render the Flash storage system 100*c* secured against unauthorized access.

Embodiments of the above Flash storage systems 100*a*-100*c* may also be implemented in more complex Flash storage systems, including card-based Flash storage system. An example is illustrated in FIG. 2, where a card-based Flash memory storage system 200 having the security enhancements described above is shown.

Referring to FIG. 2, the card-based Flash memory storage system 200 follows the architecture shown in FIG. 1A insofar as the user key is stored in the volatile memory of each Flash memory controller. Like previous described Flash memory storage systems, the illustrated system 200 includes a CPU 210, a CPU memory 214 (which may be volatile RAM memory), and a CPU backup memory space 218 (which may be non-volatile or Flash memory). The system 200 also includes first, second, third, and fourth Flash controllers 202, 222, 242, and 262, each having its own Flash controller memory 204, 224, 244, and 264 (which may be volatile RAM memory), and each having its own Flash memory or storage array 208, 228, 248, and 268. Each Flash memory array 208, 228, 248, and 268 is coupled to and communicates with one of the Flash controllers 202, 222, 242, and 262, respectively, via a separate communications bus 212, 232, 252, and 272, respectively. A primary controller 290 receives data requests over a primary interface link 292 and provides these requests to the Flash controllers 202, 222, 242, and 262 over communication links 212, 232, 252, and 272, respectively. Although not expressly shown, the card-based Flash memory storage system 200 of FIG. 2 may also include a power system configured to allow the system 200 to preserve the integrity of the data stored on the system in the event of a power failure.

In accordance with the disclosed embodiments, each Flash controller memory 204, 224, 244, and 264 may have a respective user key 220, 240, 260, and 280 stored therein for encrypting and decrypting the data prior to storing it in the Flash memory arrays 208, 228, 248, and 268. The user keys 220, 240, 260, and 280 in each Flash controller memory 204, 224, 244, and 264 may be the same user key, but it is also possible for at least one user key to be different from at least one other user key. Even if all other inputs to the encryption algorithm or sequence generation functions are identical, the use of different user keys enables each of the Flash memory controllers 202, 222, 242, and 262 to produce differing encrypted data outputs in response to the identical raw data input.

In some embodiments, the card-based Flash memory storage system 200 may follow the approach of the Flash storage system 102*b* of FIG. 1B, where the user key is stored in the CPU memory 214. In these particular embodiments, the user key may be destroyed by removing power from the system, thereby cutting power to the CPU memory 214 and the Flash controller memory 204, 224, 244, and 264. Additionally, other system-related information, such as a table of Logical-to-Physical address mappings, may also be destroyed by removing power from the system. Care should be taken, of course, to ensure that power is removed immediately and not maintained as part of an orderly shutdown.

In still other embodiments, the card-based Flash memory storage system 200 may follow the approach of the Flash storage system 100*c* of FIG. 1C, where a user key is stored in a designated page in one of the Flash memory storage chips of each Flash memory array 208, 228, 248, and 268. In these embodiments, the user key may be destroyed by erasing the block containing the designated page where the user key is stored, or writing dummy or other data to that designated page to overwrite the user key. Either of these methods may be implemented automatically by asserting a special command or signal as part of an emergency shutdown process.

The above card-based Flash memory storage system 200 may then be used to construct module-based Flash memory storage systems. An example of a module-based Flash memory storage system is shown in FIG. 3 at 300.

Figure 3:
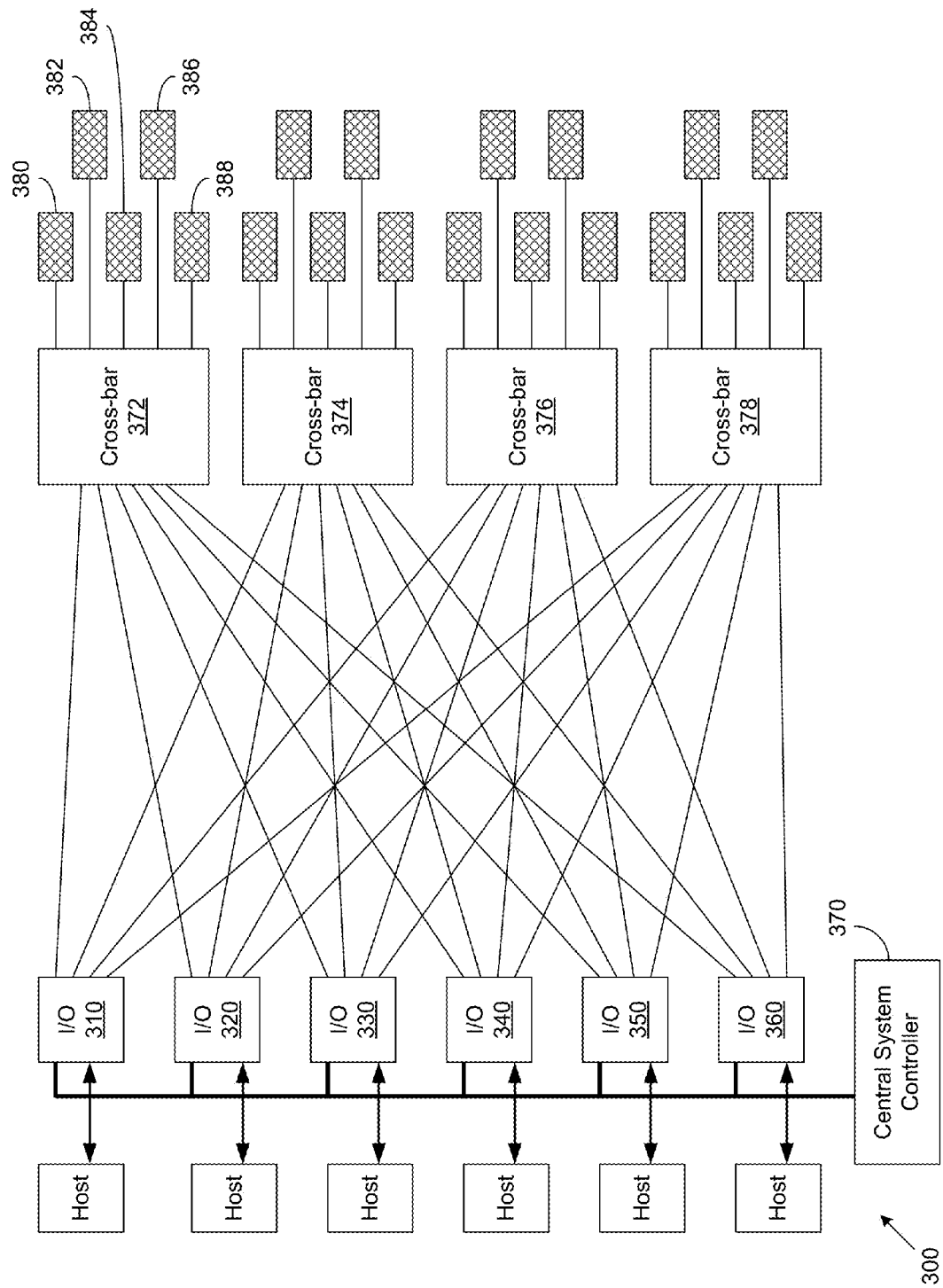
FIG. 3 illustrates an example of a module-based Flash memory storage system in accordance with the disclosed embodiments.

As can be seen in FIG. 3, the module-based Flash memory storage system 300 includes a number of I/O modules 310, 320, 330, 340, 350, and 360. Each I/O module may receive communications from an external host (which is not considered part of the system 300) using one or more known communication protocols, including Fibre Channel, Infiniband, SATA, USB and other known communication protocols. Each I/O module is also coupled to and communicates with a central system controller 370 via bi-directional communication. In addition, each I/O module may exchange data and communications over one or more communication links with a number of cross-bar switching elements 372, 374, 376, and 378, each of which is also coupled to receive commands and control signals from the central system controller 370. The cross-bar switching elements, in turn, are each coupled to a plurality of card-based Flash memory storage systems, a few of which are labeled here as 380, 382, 384, 386, and 388 for reference. Although not expressly shown, the entire module-based Flash memory storage system 300 may be equipped with a power system that is configured to guard against data loss in the event of a power failure.

In operation, the module-based Flash memory storage system 300 encrypts data using an algorithm (possibly shuffling and scrambling, as described earlier) derived from a user key and, optionally, one or more system-based inputs prior to storage in the various Flash memory arrays of the system. Then, when unauthorized system access appears imminent, a system operator may initiate an emergency shutdown of the system to (i) flush the user key from the Flash controller memory or the CPU memory, (ii) erase the block containing the designated page where the user key is stored, or (iii) overwrite the page where the user key is stored.

Figure 4:
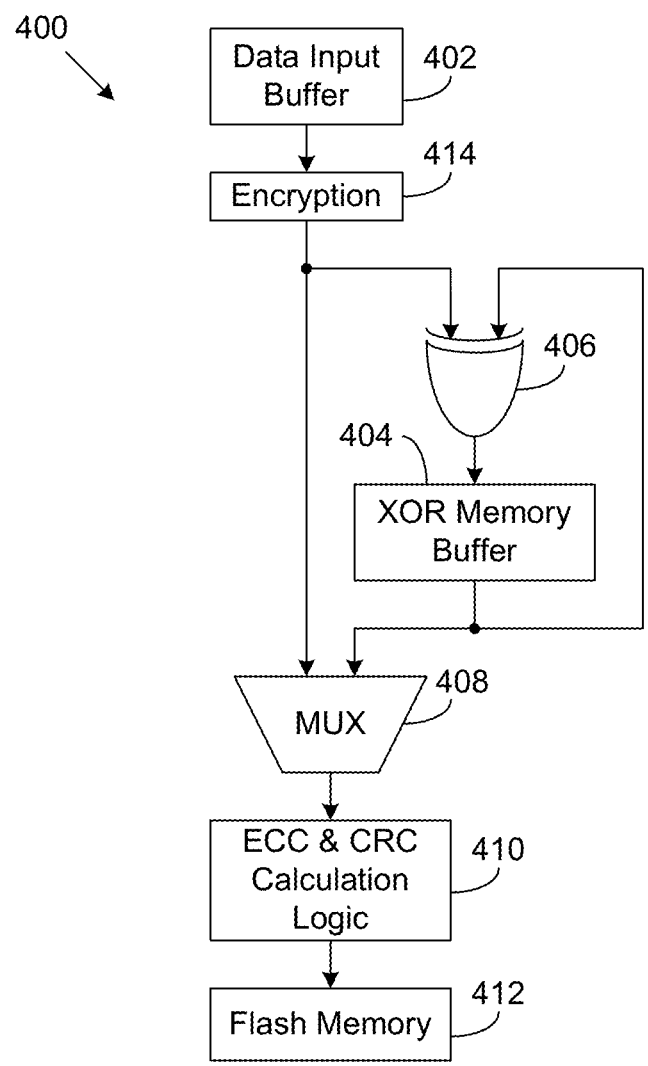
FIG. 4 illustrates an exemplary circuit for a flash memory storage system in accordance with the disclosed embodiments.

Referring now to FIG. 4, encrypting the data in some embodiments may be performed by the Flash controller in each respective Flash memory storage system, for example, in conjunction with the operations that generate the data protection pages. To this end, an XOR circuitry 400 is disclosed that includes an input memory buffer 402, an addressable XOR memory buffer 404, a multi-bit XOR circuit/buffer 406 and a multiplexer (MUX) 408. ECC and CRC calculation logic 410 is also illustrated, as is the physical Flash memory array 412. In the illustrated embodiment, each of the input buffer 402, XOR buffer 404, XOR circuit 406 and MUX 408 operate on a page of information.

The circuitry 400 of FIG. 4 operates as follows. Data destined for the Flash memory 412 passes first through input memory buffer 402. If this data is the first page of a new page stripe, the data is copied directly into the addressable XOR memory buffer 404 as it flows into the downstream ECC and CRC calculation logic 410. For the second and subsequent pages of a page stripe, previous data in the addressable XOR memory buffer 404 is unloaded and XORed by the multi-bit XOR circuit/buffer 406 with new data as the new data is unloaded from the input memory buffer 402. The result is then written back into the addressable XOR memory buffer 404, yielding the XOR of all data pages up to and including the current one. This operation is repeated until the data in the addressable XOR memory buffer 404 reflects the XOR of the data in the data pages that make up the page stripe at issue, after which the addressable XOR memory buffer 404 is written to Flash memory 412. Multiplexer 408 selects between current data and the resulting XOR calculation. Such an XOR operation may be performed through the use of software, firmware, or a combination of both.

In accordance with the disclosed embodiments, the XOR circuitry 400 of FIG. 4 may be modified to include an encryption module 414 for encrypting the data. The encryption module 414 is preferably positioned between the data input buffer 402 and the XOR gate 406 in the XOR circuitry 400, but may also be placed at a number of other locations in the XOR circuitry 400. For example, the encryption module 414 may instead reside between the MUX 408 and the ECC & CRC calculation logic 410, or between the ECC & CRC calculation logic 410 and the Flash memory 412. Note that in the preferred placement of the encryption module, between the data input buffer 402 and the XOR gate 406, the data protection pages are not individually encrypted. It is also important to understand, however, that the XOR function will be operating on previously encrypted data, thereby securing each data protection page indirectly. For other placements of the encryption module, it is possible to individually encrypt each data protection page in addition to the other raw data pages.

In operation, data destined for the Flash memory 412 first passes through the data input buffer 402. From the data input buffer 402, the data is encrypted by the encryption module 414, then forwarded to the XOR gate 406. If the encrypted data is destined for the first page of a new page stripe, then it is copied directly into the addressable XOR memory buffer 404 as such data flows downstream to the ECC and CRC calculation logic 408. For data that is from the second and subsequent pages of a page stripe, previously encrypted data in the addressable XOR memory buffer 404 is unloaded and XORed with newly encrypted data as the newly encrypted data becomes available at the output of encryption module 414. The result is then written back into the addressable XOR memory buffer 404, yielding the XOR of data from all pages of the page stripe up to and including the current page. This operation is repeated until the data in the addressable XOR memory buffer 404 reflects the XOR of the data in the pages that make up the page stripe at issue, after which the addressable XOR memory buffer 404 is written to Flash memory 412.

As noted above, any number of commonly-available and widely-used encryption algorithms may be employed to encrypt the data written to Flash memory 412 (see, e.g., US Published Application No. 2004020535, entitled "Scrambler Circuit," and incorporated herein by reference). In one exemplary implementation, however, the encryption module 414 may encrypt the data by shuffling (reordering) it and then XORing it with a scrambling sequence, as illustrated in FIGS. 5A and 5B.

Figure 5A:
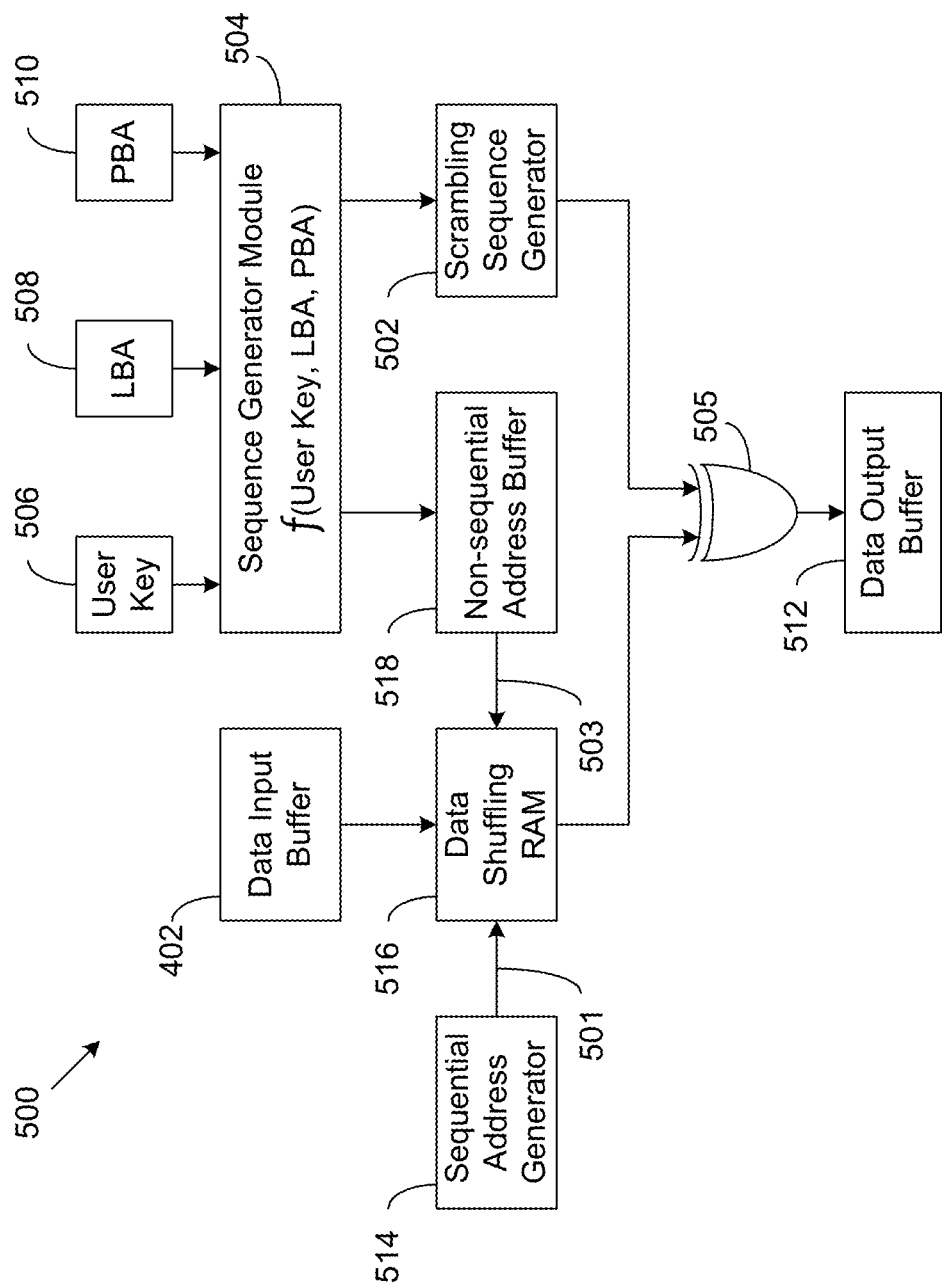
FIGS. 5A and 5B illustrate exemplary encryption and decryption modules for a Flash memory storage system, respectively, in accordance with the disclosed embodiments.
Figure 5B:
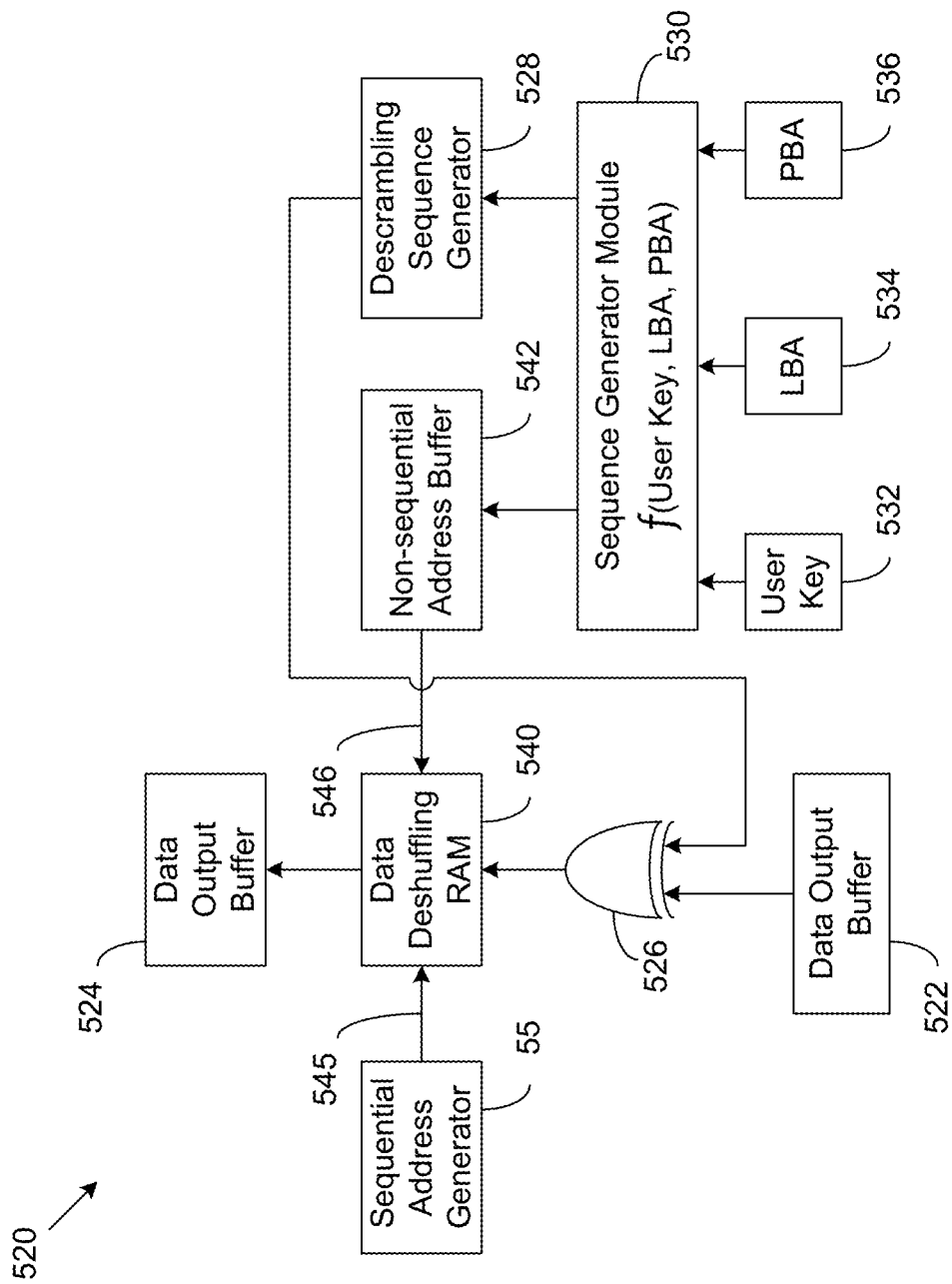

FIG. 5A illustrates an exemplary implementation of an encryption module 500, such as the one that may be used in the XOR circuitry 400 of FIG. 4, according to the disclosed embodiments. As can be seen, the encryption module 500 has a number of functional components, which may include hardware components, software components, or both.

In this implementation, data from the data input buffer 402 is delivered to a dual-ported data shuffling RAM 516 at RAM addresses that are provided by a write address bus 501. The write address bus 501 is supplied by a sequential address generator 514, which increments the RAM address (e.g., by one address) after each word (or byte, or other predefined length) is written into the data shuffling RAM. Data is read from the data shuffling RAM 516 at addresses provided by a read address bus 503. The read address bus 503, in turn, is fed from a non-sequential address buffer 518, which results in data being unloaded from the data shuffling RAM 516 in a different order from the order in which the data was written. The output of the data shuffling RAM 516 is then combined with the output of a scrambling sequence buffer 502 using an XOR gate 505, with the combined data being subsequently stored in a data output buffer 512. The combination of the data shuffling RAM 516, the scrambling sequence buffer 502, and the XOR gate 505 serves to reorder and then selectively invert (scramble) each incoming raw data page. The contents of the non-sequential address buffer 518 and the scrambling sequence buffer 502 are generated by a sequence generator module 504 that takes as inputs a user key 506, a logical block address (LBA) 508, and a physical block address (PBA) 510 to generate such contents. Such a sequence generator module 504 may use any suitable functions to generate the shuffling and scrambling sequences, including any of several well-known data encryption algorithms (e.g., AES, DES, RCS, Blowfish, IDEA, NewDES, SAFER, CAST5, FEAL, etc.), any of several commonly-available hashing functions (e.g., additive, multiplicative, rotative, etc.), or any other stable and well-defined functions. And because the LBA 508 and PBA 510 will generally differ for each page of raw data, even pages having identical raw data will be encrypted differently.

In the exemplary implementation shown, the sequence generator module 504 uses multiple inputs to generate the shuffling and scrambling sequences, including the user key 506, the (LBA) 508, and the PBA 510. In other implementations, however, the sequence generator module 504 may use only the user key, or only the user key and either the LBA or the PBA, or the user key and some other system-based input, to generate its outputs. The particular LBA used by the sequence generator module 504 is typically provided by an external host along with the data to be encrypted as part of the WRITE operation, while the PBA is determined by the Flash controller using the LPT to map each logical address to an available physical address. Because the encryption occurs on a page-by-page basis in most embodiments, the LBA and PBA are likely to vary with each WRITE operation. The user key, on the other hand, remains the same for each WRITE operation in most embodiments until an operator replaces the user key by storing a new user key in (i) the Flash controller memory, (ii) the CPU memory, or (iii) a designated page in the Flash memory array (see FIGS. 1A-1C).

In operation, the user key and/or the LBA and/or the PBA from a WRITE operation are processed by the sequence generator module 504 to fill the non-sequential address buffer 518 (a shuffling sequence) and the scrambling sequence buffer 502. Similarly, data that was provided by an external host as part of the WRITE operation is placed in the data input buffer 60 and subsequently placed in the data shuffling RAM 516. The data in the data shuffling RAM 516 and the scrambling sequence in the scrambling sequence buffer 502 are then XORed by the XOR gate 505, typically on a bit-by-bit basis, resulting in an encrypted page of data. The encrypted page of data is thereafter provided to the data output buffer 512 for further processing by the XOR circuit 400 (see FIG. 4). The above process is repeated until data from each data page of a page stripe has been encrypted. Note in the foregoing that although encryption is typically performed on a whole page of data at a time, it is also possible to encrypt less than an entire page of data at a time. For example, it is possible to encrypt half of a page, a third of a page, a quarter of a page, and so forth, such that the same LBA and/or PBA may be used multiple times.

Although the above embodiment contemplates shuffling the order in which data pages are unloaded from the data shuffling RAM 516, such shuffling need not result in the data pages being unloaded in a different order from the order in which the data was loaded into the data shuffling RAM 516. For example, it is possible in some embodiments for data pages to be unloaded from the data shuffling RAM 516 in the same order in which the data pages were loaded. This may be accomplished, for example, by using the same alpha, numeric, or alphanumeric sequence as the shuffling sequence for every page. It also possible, of course, to simply omit the data shuffling RAM 516 altogether so there is no shuffling of the data pages.

Decryption of the data is illustrated in FIG. 5B, which shows an example of a decryption module 520 according to the disclosed Flash storage system. The decryption module 520 is similar in design to the encryption module 500 in that it has a data input buffer 522 and a data output buffer 524 for taking in data from a READ operation of the disclosed Flash storage system. The other components of the decryption module 520, as shown in FIG. 5B, are similar to their counterparts in FIG. 5A. Thus, a sequence generator module 530 is provided that produces a deshuffling sequence and a descrambling sequence using a user key 532, an LBA 534, and a PBA 536. The sequence generator module 530 stores the deshuffling sequence and the descrambling sequence in a non-sequential address buffer 542 and a descrambling sequence buffer 528, respectively. For a given page of encrypted data, these two sequences are identical to the shuffling and scrambling sequences used to originally encrypt the data. Data from the data input buffer 522 is XORed with the descrambling sequence using an XOR gate 526, and is subsequently loaded into a data deshuffling RAM 540 at RAM addresses provided by a write address bus 546. Data is unloaded sequentially from the data deshuffling RAM at address locations provided by a sequential address generator 538 on a read address bus 545.

Operation of the decryption module 520 is likewise similar to operation of the encryption module 500 by virtue of the fact that the XOR operation followed by the deshuffling operation reverses the encryption originally performed on the raw data. Given the same inputs, sequence generator module 530 generates the same sequences used to shuffle and scramble the raw data, which in turn may be used to descramble and deshuffle the encrypted data.

Figure 6D:
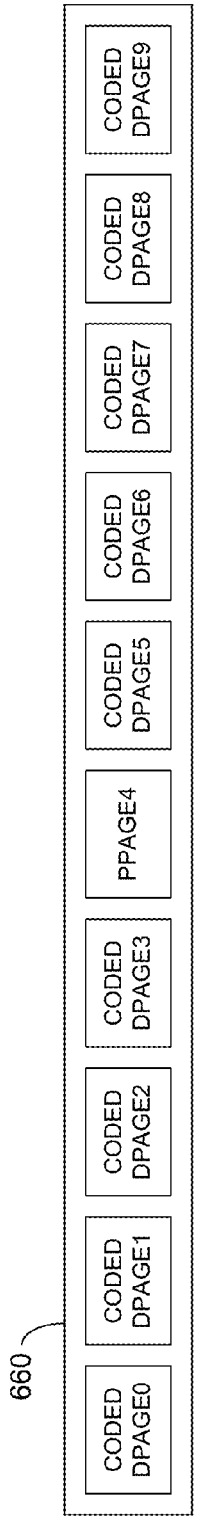

FIGS. 6A-6F illustrate examples of page stripes in accordance with the implementations of the systems and methods of the present disclosure. As can be seen in FIG. 6A, in one implementation, some page stripes 600 may include nine pages, with each page having encrypted data therein (CODED DPAGE0, CODED DPAGE1, CODED DPAGE2 . . . CODED DPAGE8), and one page with data protection information (PPAGE9) representing an XOR of the nine pages with the encrypted data. In another implementation, some page stripes 640 may include eight pages having encrypted data (CODED DPAGE0-CODED DPAGE7) and one page with data protection information (PPAGE8), as reflected in FIG. 6B. FIG. 6C illustrates yet another page stripe 650 in which there are seven pages that have encrypted data (CODED DPAGE0-CODED DPAGE6) and one page of data protection information (PPAGE7).

Figure 6E:
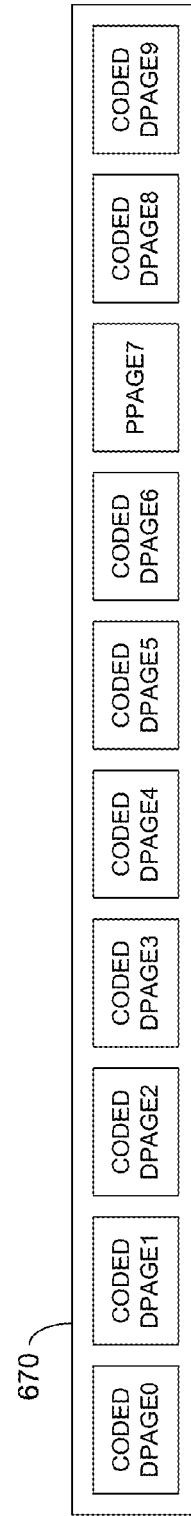
Figure 6F:
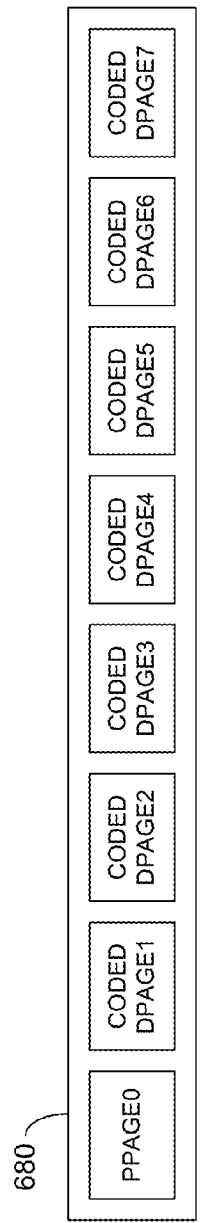

It is also possible in the Flash storage systems and methods of the present disclosure to locate the page with the data protection information somewhere other than the last page of a given page stripe. For example, referring to FIG. 6D, a page stripe 660 is shown having nine pages with encrypted data and one page with data protection information, but the page with the data protection information is located at the PAGE4 location. As another example, FIG. 6E illustrates a page stripe 670 with nine pages having encrypted data and one page with data protection information, where the page with the data protection information is located at the PAGE7 location. FIG. 6F illustrates an example of a page stripe 680 having seven pages with encrypted data and one page with data protection information located at the PAGE0 location. Other variations of the page stripes shown in FIGS. 6A-6F may of course be derived without departing from the scope of the disclosed embodiments.

With the various page stripes having data encrypted as described above, the data in the Flash storage system may be more impervious or at least less susceptible to unauthorized access or use. This may be confirmed, for example, by simply cutting power to the system to clear the user key from volatile memory for embodiments where the key is stored in the Flash controller memory or the CPU memory. As mentioned above, however, power should be removed through an emergency shutdown as opposed to an orderly shutdown (which may take longer due to the data backup process). This emergency shutdown may be implemented, for example, by incorporating an option to bypass the data backup process and proceed directly to the emergency shutdown process upon assertion of a certain command or signal. For embodiments where the user key is stored in non-volatile memory, the key may be erased or overwritten instead, thereby obviating the need to bypass the backup process. As before, such an erase or overwrite operation may be performed automatically via a special command or signal executed when an emergency shutdown is performed.

FIGS. 7A and 7B illustrate exemplary methods for implementing an emergency shutdown of the Flash storage system according to the disclosed embodiments. While not limited to any particular embodiments, it is contemplated that the method of FIG. 7A may be used for embodiments where the user key is stored in volatile memory, and the method of FIG. 7B may be used for embodiments where the user key is stored in nonvolatile memory.

As can be seen in FIG. 7A, a method 700a for quickly shutting down the Flash storage system includes a step 701, where a determination may be made by the CPU as to whether a given power failure is due to an emergency shutdown being initiated (as opposed to an unexpected power loss resulting from, for example, an interruption of the AC main). If the answer is yes, then the method 700a bypasses the orderly shutdown process and proceeds directly to step 708, where the state of the system is set to a shutdown state and the CPU issues a command to immediately shut down the system without backing up data into the Flash memory arrays. This ensures that the user key is cleared from the volatile memory such that there is no feasible way for anyone to retrieve the user key from the system.

If the answer is no, then the method 700a proceeds to begin the system's orderly shutdown process. At step 702, the CPU will determine whether there are any active on-board operations about to be issued at the time the primary power failure was detected. If such operations exist, the CPU will abort those operations.

After confirming there are not any active operations (or aborting any detected underway operations), the CPU will determine the state of the system at step 703. If the state of the system was such that the system was properly operational (e.g., GOOD), such that there is data that potentially needs to be backed up, then the system proceeds to implement the backup process. If the CPU determines at step 703 that the system was not operating properly at the time of the primary power failure (e.g., the primary power was lost before the system was brought into proper operating condition), such that there is no information that needs to be backed up, then the process skips the backup operation and goes straight to the shutdown operation, discussed in more detail below.

Assuming that step 703 indicates that the Flash storage system was operating properly at the time of the failure of primary power, the backup/shutdown process proceeds to step 704 where it blocks out any external access to the Flash memory storage system. This step ensures that no commands (e.g., READ or WRITE commands) may be received by the system from an external host. In one embodiment, access to the Flash storage system is locked out, such that a host would be able to detect the locked-out state in the event of an attempted access. In other embodiments, the CPU may send positive notification to the hosts via the Flash storage system that a power failure has occurred. However, such notification may take time and require power that may be needed to complete the backup operations. As such, the most power efficient approach would be the one where no positive notification is provided to the hosts by the Flash storage system.

After the external access is locked out in step 704, the CPU will monitor the system to ensure that any internal operations underway (e.g., a MOVE operation, the completion of a WRITE operation, etc.) are completed and the board hardware is idle before moving to the next step. One approach for such verification is to have the CPU issue a "no operation" or "NOP" command to each of the lanes within the Flash memory array. The return of a completed status for each of these commands confirms that the NOP commands have been completed and that the system is idle.

Once it is determined that the system is idle and that all outstanding commands have been completed, the CPU will then disable the engine that performs the logical to physical address conversions in step 705 and, in conjunction with the Flash controller, proceed to store information that creates a backup image of the system that may be used to quickly and correctly restore the system to the condition that existed at the time of the primary power failure.

Steps 706 and 707 illustrate the storage of backup data into secure memory locations by the CPU and the Flash controller. In the illustrated embodiment, some of the data is stored as a result of actions taken by the Flash controller and other data is stored as a result of actions taken by the CPU, although it will be understood that the operations could be performed by a single controller or otherwise divided between the CPU and the Flash controller. In one embodiment, data that the CPU wants to have written to the Flash memory array will be written by the CPU into the Flash controller memory used by the Flash controller and the CPU will then instruct the Flash controller to write such data to the Flash memory array.

In the illustrated example, step 706 involves the storage of the Logical-to-Physical translation table and any error detection and/or error correction information stored in the LPT table in the Flash memory array. In the example, this is accomplished through operation of the Flash controller taking the data in the LPT table (which in the illustrated example would have been stored in the Flash controller memory) and storing that data in the Flash memory array. The Flash controller may also receive and store in the Flash memory array the information stored within the CPU memory in the same manner.

In step 707, the CPU stores certain potentially critical data in the CPU backup memory space described above. Such potentially critical data may include data reflecting the location of bad blocks within the Flash memory array, a pointer pointing to the location in the Flash memory array where the Flash controller stored the LPT and CPU memory data, and error correction information (e.g., CRC information) associated with the stored critical data.

In an alternate embodiment, a predetermined portion of the Flash memory array may be dedicated to the storage of backup information. In such an alternate embodiment, it may be unnecessary to have a pointer as described above, as the storage location of the backup information within the Flash memory array would be fixed and predetermined. The use of a fixed, reserved and predetermined Flash memory space in the Flash memory array for the storage of backup data may not be optimal for all applications. As such, a still further alternate embodiment is envisioned where the location to which the backup data is stored within the Flash memory array may vary, either for each start-up of the Flash storage system, or during the operation of the Flash storage system. In such an embodiment, the use of the described pointer identifies exactly where in Flash memory array the backup data is stored.

To ensure that there is adequate available storage space within the Flash memory array for the storage of backup information, embodiments are envisioned where portions of the Flash memory array are reserved and maintained in a cleared, ready-to-write configuration such that there is always available memory for the immediate storage of backup data. Such memory space can be reserved initially upon startup of the system or can be dynamically constructed during operation such that there is always space available for the storage of backup information. In one embodiment, the reserved memory space for the storage of backup data is selected to represent contiguous memory locations.

After the backup data is stored in the Flash memory array and the CPU backup memory space, the CPU changes the state of the system to SHUTDOWN in step 708 and issues a command to shut down the system. Such a command may involve the assertion of a specific signal or command that may be used to control the power control circuitry to power down the components of the system in an orderly fashion.

In one embodiment, the Flash controller is initially configured to support the backup and shutdown process along with the processes that are required during normal operation. Some FPGAs, however, are limited in their available internal resources, and may not be capable of simultaneously supporting both the circuitry required for normal operation and the circuitry required for the backup and shutdown process described above. To enable the use of such FPGA devices, alternate embodiments are envisioned wherein two "images" are provided for the FPGA, with each image configuring the FPGA to provide the circuitry required for operation under one set of conditions. In this embodiment, one programming image for the FPGA may be provided to configure the FPGA for normal operation and another image may be provided for the implementation of the backup and shutdown process. In this embodiment, the CPU, upon the detection of a primary power failure and a determination that there are no longer any pending "normal" operations, will execute a command to cause the FPGA to "change images," switching from the image that provides the circuitry for normal operation to the image that provides the circuitry for backup and shutdown. In this embodiment, a still further image may be provided to configure the FPGA for restore and power up operations.

In an alternative implementation, illustrated in FIG. 7B, a method 700b for performing an emergency shutdown of the Flash storage system includes the same step 701 as in FIG. 7A, where a determination may again be made by the CPU as to whether a given power failure is due to an emergency shutdown being initiated. If the answer is no, then the method 700b proceeds in the same manner as in FIG. 7A to perform an orderly shutdown of the system. However, if the answer is yes, then the method 700b proceeds to step 709, where either the Flash controller or the CPU executes a special command to: (i) erase the block in the Flash storage system containing the user key, or (ii) overwrite the page in the Flash storage system containing the user key. This ensures that the user key is removed from the designated nonvolatile memory location in the Flash storage system and can no longer be used to decrypt the data in the system. The method 700b thereafter proceeds to step 702 in the same manner as in FIG. 7A to perform an orderly shutdown of the system.

The foregoing methods 700a and 700b may be performed in some embodiments with the aid of emergency shutdown circuitry for allowing the CPU to determine whether a power failure is a result of an emergency shutdown or an unexpected power loss. A number of designs and techniques are available for implementing such emergency shutdown circuitry, including discrete logic components, programmable ICs, and/or combinations of both, and those having ordinary skill in the art will understand that the particular implementation is not critical to the disclosed Flash storage system. An exemplary implementation of an emergency shutdown circuit that may be used with the methods discussed above is illustrated in FIGS. 8A and 8B.

Figure 8A:
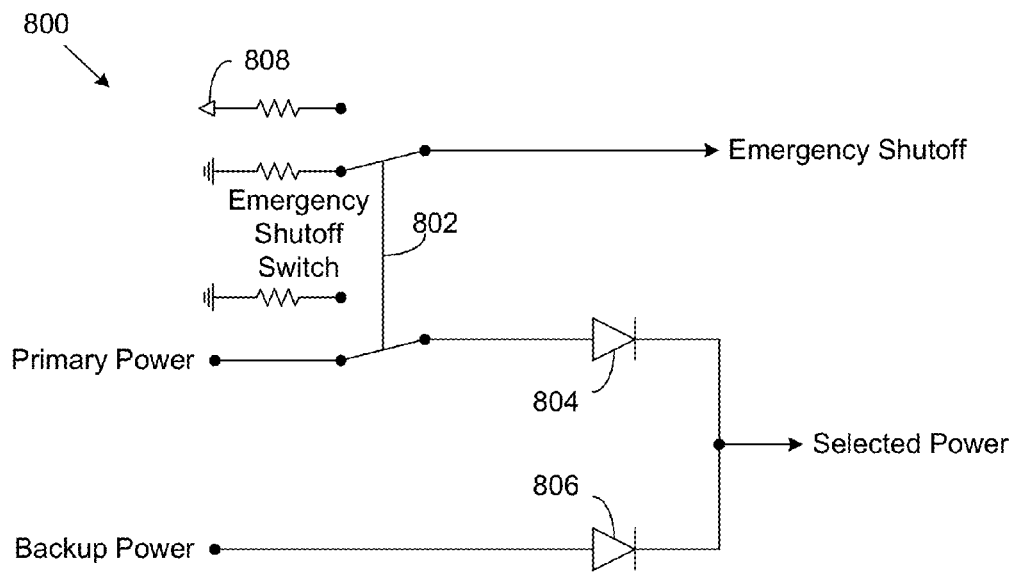
FIGS. 8A and 8B illustrate an exemplary circuit for initiating an emergency shutdown of a Flash memory storage system in accordance with the disclosed embodiments.

Referring to FIG. 8A, an emergency shutdown circuit 800 is shown according to the disclosed embodiments that includes an emergency shutoff switch 802 connected to the power circuit. The emergency shutdown circuit 800 is specifically connected between the primary power supply and a diode 804 of a power select circuit. The power select circuit selects from between primary power and a backup power via another diode 806. This switch 802 is configured so that, when actuated, it disconnects the primary power from the rest of the Flash storage system and generates an emergency shutoff signal. Preferably, the emergency shutdown switch 802 is a hardware switch, but it may also be implemented as a software switch in some embodiments.

In the illustrated embodiment, the emergency shutdown switch 802 resembles or otherwise has the functionality of a double-pole double-throw switch. Of course, other types of switching functionality known to those having ordinary skill in the art may also be used. The emergency shutdown switch 802 has one set of poles configured to allow switching between the primary power and system ground, and another set of poles configured to allow switching between a logic-high voltage supply 808 (e.g., 1.5 V, 3.3 V, 5.0 V, etc.) and system ground. The second set of poles may also be arranged in reverse order depending on whether logic-high or logic-low is used for the emergency shutoff signal. In any event, switching at the two sets of poles takes place nearly simultaneously such that the primary power supply is removed from the Flash storage system at almost the same time that the emergency shutoff signal is asserted when the emergency shutdown switch 802 is actuated.

Figure 8B:
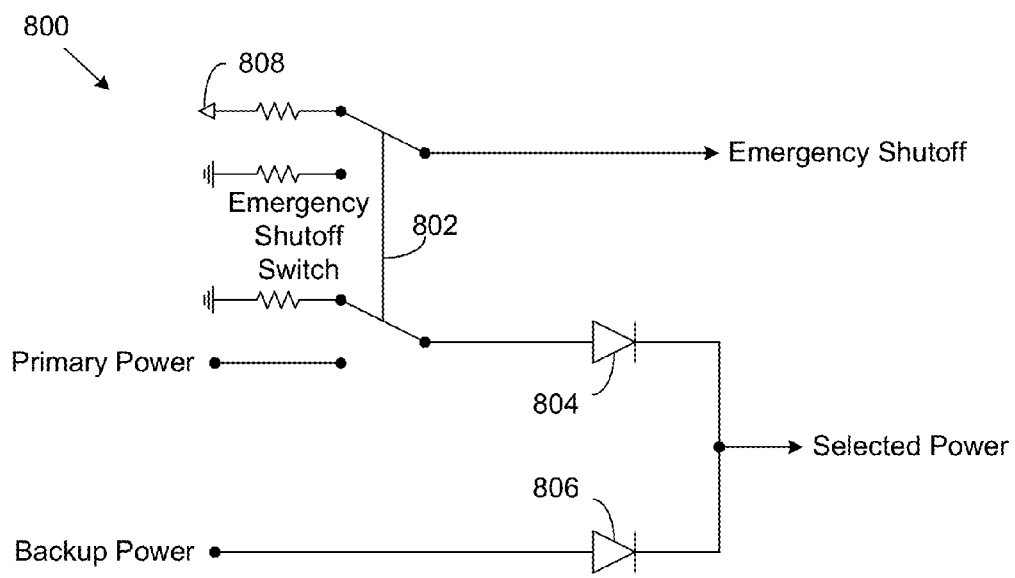

FIG. 8B illustrates an example of the emergency shutdown switch 802 after it has been actuated. As can be seen, the diode 804 is now connected to system ground, and the emergency shutoff signal is now connected to the logic-high voltage supply 808.

In accordance with the disclosed embodiments, the emergency shutoff signal is fed to one of the inputs of the CPU (not expressly shown). This emergency shutoff signal acts as an indicator to the CPU that an emergency shutoff has been initiated in the Flash storage system. The CPU, upon detecting the assertion of the emergency shutoff signal combined with the loss of the primary power supply, recognizes or otherwise concludes (via the software executed thereon) that an emergency shutdown of the Flash storage system is in progress and not merely an unexpected power loss. The CPU thereafter bypasses any backup procedure that may be in place and proceeds immediately to power down the Flash storage system. This immediate powering down of the Flash storage system causes the user key to be flushed from the volatile memory of the system (depicted in FIG. 7A). For embodiments where the user key is stored in non-volatile memory, the CPU causes the block in which the user key is stored to be erased, or the page in which the user key is located to be overwritten, before powering down the Flash storage system (depicted in FIG. 7B).

Other embodiments may also be implemented in addition to the above. For example, it may be desirable in some embodiments to effectuate an emergency shutdown without involving either the CPU or the Flash memory controller. Such an emergency shutdown may be carried out, for example, using a mechanical kill switch that an operator of the system may hit or punch to shut down the Flash storage system. The mechanical kill switch is typically mounted in a place that is easy to access and is designed to power down a system immediately. An exemplary implementation of a mechanical kill switch is shown in FIG. 9 in accordance with the embodiments.

Figure 9:
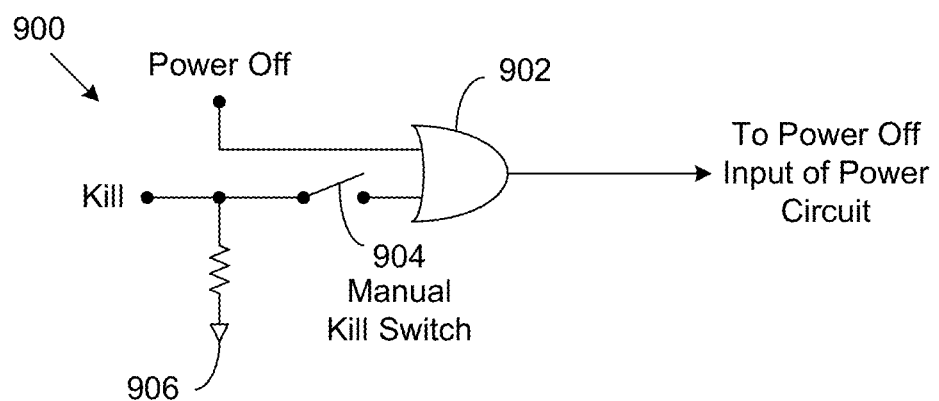
FIG. 9 illustrates another exemplary circuit for initiating an emergency shutdown of a Flash memory storage system in accordance with the disclosed embodiments.

As can be seen in FIG. 9, an emergency shutdown circuit 900 includes an OR gate 902 having an output that is provided to the power off input of a power circuit (not expressly shown). The OR gate 902 is interposed between a power off signal and the power off input of a power circuit. Such a power off signal is typically asserted after the data backup process is completed to cause power to be removed from the Flash storage system. In the illustrated embodiment, however, the power off signal is provided as one of the inputs to the OR gate 902 instead. A kill switch 904 provides the other input to the OR gate 902. The kill switch 904, in turn, is connected to a logic-high voltage supply 906 (or to system ground, depending on the logic scheme implemented), which serves as a kill signal. The output of the OR gate 902 will thus be either the power off signal or the kill signal from the mechanical kill switch 904, or both. Under such an arrangement, either the power off signal or the kill signal may trigger the power off input of the power circuit to remove power from the Flash storage system.

In normal operation, the power off signal is asserted by the CPU in the usual manner, which is typically only after any backup process that may be in place has completed. This power off signal is then conveyed to the power off input of the power circuit to cause the power circuit to begin removing power from the various system components to power down the Flash storage system. Hitting the mechanical kill switch 904 bypasses the usual manner. It immediately asserts the power off signal and conveys it to the power off input of the power circuit, thereby causing the power circuit to begin removing power from the various system components to power down the Flash storage system. As such, when unauthorized access to the Flash storage system appears imminent, an operator (or other personnel) may hit the mechanical kill switch 904 to immediately cause power to be removed from the Flash storage system, without waiting for the system to perform its normal backup process.

Note that although the circuits of FIGS. 8A, 8B, and 9 have been shown and described with respect to a backup power supply system having one CPU, the principles and teachings disclosed herein may be scaled as needed so that the disclosed emergency shutdown switch and mechanical kill switch may be connected to multiple CPUs and/or multiple Flash controllers, respectively, as needed.

Encrypting the data stored in a Flash memory array by shuffling then scrambling each shuffled data page in the manner described above has been observed to be both effective in terms of rendering the data indecipherable and efficient in terms of the amount of system overhead needed. In some embodiments, however, it may be desirable to encrypt the data in a data page using a standard or conventional encryption algorithms, such as AES and the like. In these embodiments, the data page may need to be encrypted in chunks, each chunk having a predetermined number of bits based on the size of the block cipher. An example of the structure or layout for a physical page (i.e., as stored in the Flash memory array) for an exemplary Flash memory storage system is depicted in FIG. 10.

Figure 10:
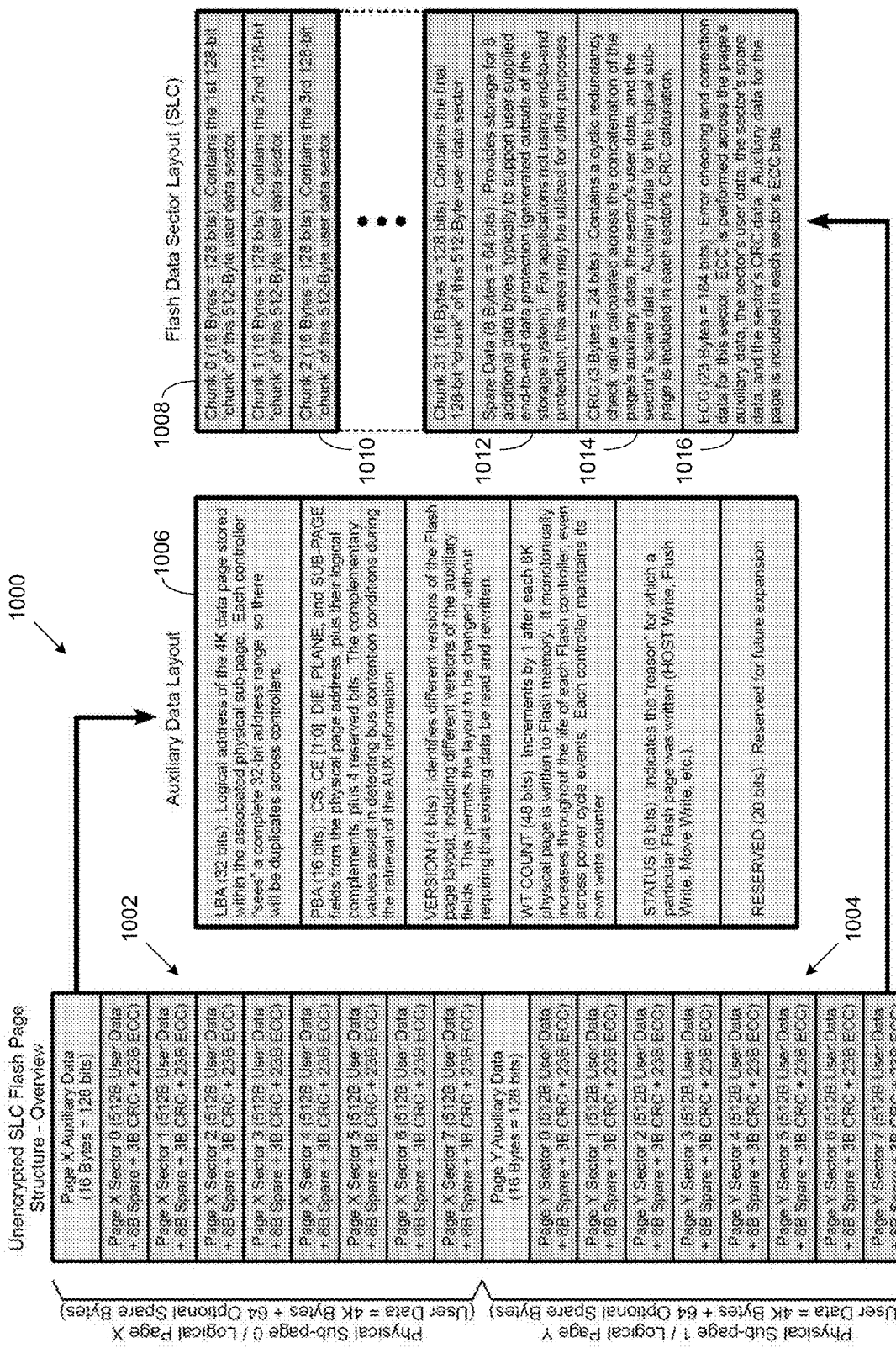
FIG. 10 illustrates an exemplary raw or unencrypted physical page structure in accordance with the disclosed embodiments.

As can be seen in FIG. 10, in some embodiments, a physical page 1000 may be divided into physical sub-pages, labeled as physical sub-page 0 (1002) and physical sub-page 1 (1004) in this example. Each of the physical sub-pages 0, 1 may correspond to a logical page, labeled as logical page X (1002) and logical page Y (1004), respectively. Each of the logical pages X, Y may include 4 KB of user data (i.e., application data) and 16 bytes of auxiliary data 1006. In the example of FIG. 10, each logical page X, Y may also include several optional or spare bytes of user data that may be used for application-specific data or other user-defined purposes as needed. In the example shown here, each logical page X, Y may have an optional or spare 64 bits of user data. Of course, those having ordinary skill in the art will understand that other embodiments may have a different number of physical sub-pages and/or logical pages, auxiliary data size, user data size, and number of optional or spare bytes (or no optional or spare bytes), without departing from the scope of the disclosed embodiments.

Of the 128 bits of auxiliary data 1006 in the above example, 32 bits may be used for the LBA, 16 bits for the PBA, 4 bits for the version number of the Flash page layout, 48 bits for the write count, 8 bits for the status indicator of the page, and 20 bits may be reserved for future expansion. The 32-bit LBA, as explained above, is the logical address of the 4 KB user data stored at the physical sub-page 0, 1 associated with the logical page X, Y containing that 4 KB user data. Each Flash controller thus sees a complete 32-bit address range for the LBA, so there may be duplicate addresses across Flash controllers. As for the 16-bit PBA, these bits may include information pertaining to a chip select (CS), chip enable (CE), die number, plane number, and the physical sub-page fields of the PBA, their logical complements, plus 4 reserved bits for future use. The logical complements assist in detecting bus contention conditions that may occur during retrieval of the information making up the auxiliary data 1006, while the version number identifies different versions of the Flash page layout or structure, including different versions of the auxiliary data fields. This allows the layout to be changed without requiring existing data to be read and rewritten. The write count is a count that is incremented by a predefined increment (e.g., one) after each 8 KB physical page is written to the Flash memory array. In some embodiments, the write count monotonically increases throughout the life of a Flash controller, including across power on-off events in some embodiments, with the Flash controller preferably maintaining its own write counter that provides the write count. Finally, the status indicator indicates which one of several predefined reasons that a particular page in the Flash memory array was written to (e.g., a host write, flush write, move write, etc.).

As for the 4 KB of user data within each logical page X, Y, this may be divided or otherwise apportioned into a certain number of sectors 1008, each sector 1008 having a predetermined size. In the example of FIG. 10, the 4 KB of user data may be divided into eight sectors 1008 so that each sector has 512 bytes of user data apiece. Within each sector 1008, the 512 bytes of user data may be further apportioned into smaller chunks 1010 of a predetermined size based on the size of the cryptographic key used to encrypt the user data. For example, in embodiments where a 128-bit encryption key is used, the 512 bytes of user data may be divided into 128-bit chunks 1010, resulting in 32 chunks (chunks 0-31) in these embodiments.

In embodiments where the logical pages X, Y also include the optional or spare 64 bits of user data, these spare 64 bits of user data may also be divided amongst the eight sectors 1008 so that each sector 1008 may include an additional eight bytes (64 bits) of spare data 1012. In some embodiments, each sector 1008 may be further provided with data protection and error correction information, including a CRC 1014 (e.g., 3 bytes) and a ECC 1016 (e.g., 23 bytes), as generated by the Flash controller. The CRC 1014 may contain a cyclic redundancy check value calculated across a concatenation of a logical page's auxiliary data 1006, a sector's user data, and the sector's spare bytes of data 1012. The ECC 1016 may contain error checking and correction data for the sector and may be derived across the logical page's auxiliary data 1006, the sector's user data, the data stored in the sector's bytes of spare data 1012, and the sector's CRC 1016. The auxiliary data 1006 for the logical pages X, Y may be included in each sector's CRC calculation and ECC bits.

Figure 11:
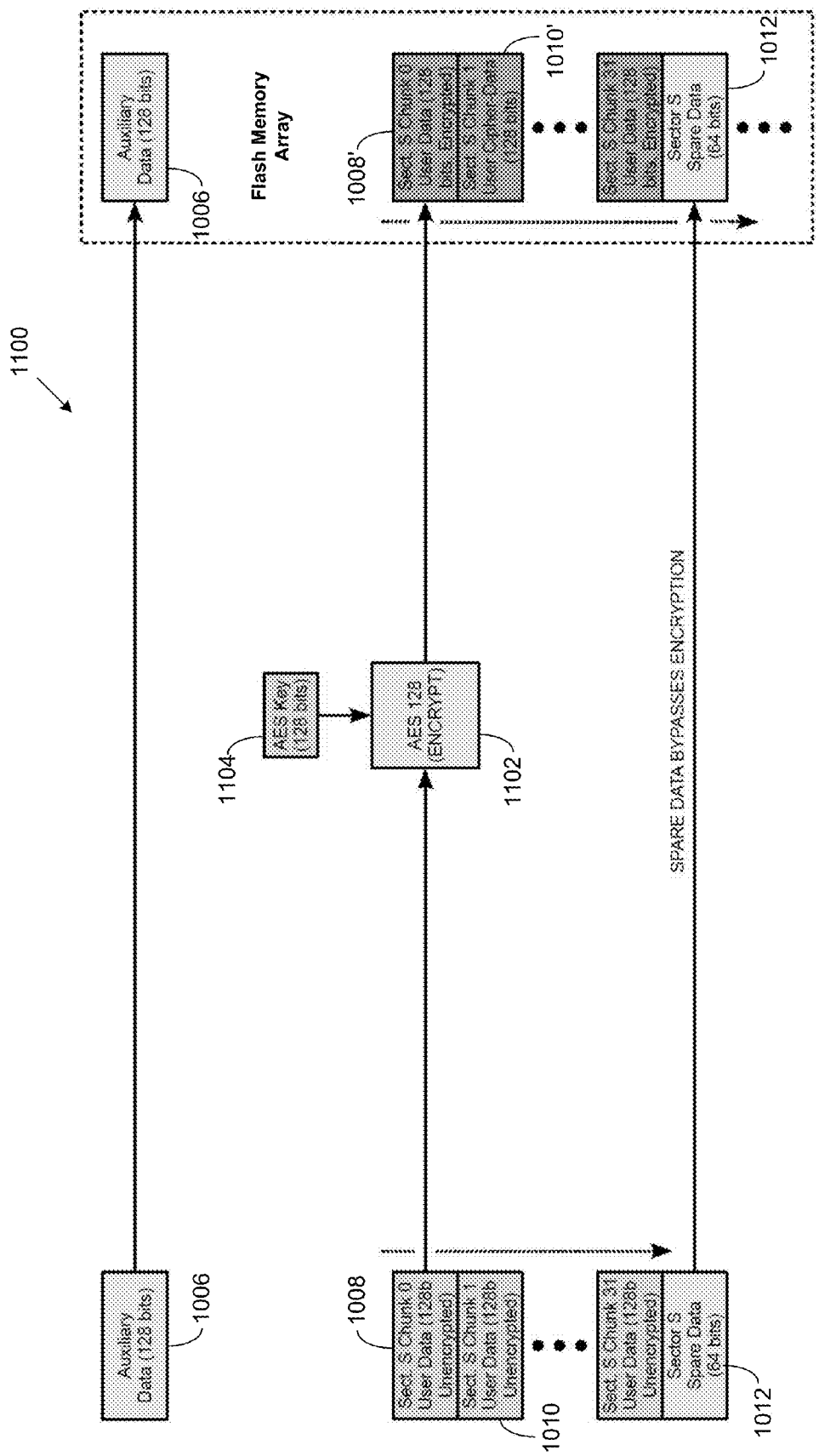
FIG. 11 illustrates an exemplary encryption flow diagram for a Flash memory storage system in accordance with the disclosed embodiments.

An exemplary implementation of an encryption scheme in a Flash controller that uses the above physical page structure or layout is illustrated in FIG. 11 through a flow diagram 1100. In the exemplary flow diagram 1100, the left portion depicts pre-processed data (i.e., before encryption), the right portion depicts post-processed data (i.e., after encryption), and the middle portion depicts the processing (i.e., encryption) that user data would undergo before being stored in the Flash memory. In this exemplary implementation, the processing may be performed by a conventional encryption module 1102, such as an AES-128 encryption module, along with a conventional cryptographic key 1104, such as a 128-bit AES key. This cryptographic key 1104 is typically provided to the encryption module 1102 by a user, but is not necessarily selected/created by the user (i.e., it may be computer generated). As is well known, AES (Advanced Encryption Standard) is a block cipher algorithm that is capable of using cryptographic keys having 128 bits, 192 bits, 256 bits, and so forth, where the length of the key being used indicates how much data the block cipher encrypts at a time.

In general operation of the exemplary Flash controller, raw or unencrypted user data (plaintext) that is to be written to the Flash memory array is organized and processed in logical pages X, Y by the Flash controller in the usual manner, with each logical page X, Y made up of a certain number of sectors 1008 (e.g., eight sectors here). The raw user data in the various sectors 1008 are then divided or otherwise apportioned into chunks 1010 within each sector 1008, each user data chunk 1010 having a predetermined number of bits (e.g., 128 bits here) based on the length of the cryptographic key 1104 used. The user data chunks 1010 are then processed or encrypted by the encryption module 1102 one user data chunk 1010 at a time to produce encrypted user data chunks 1010' (ciphertext). The ciphertext chunks 1010' from the encryption module 1102 may then be stored in the Flash memory array by the Flash controller in the usual manner.

Because the encryption key 1104 in the implementation of FIG. 11 is longer than the eight bytes (64 bits) of optional or spare data 1012 in the sectors 1008, these 64 bits of optional or spare data 1012 are not encrypted by the encryption module 1102. Instead, the eight bytes of optional or spare data 1012 may simply be passed through and stored in the Flash memory array in their raw or unencrypted form. It is of course possible to pad or otherwise extend the optional or spare data with 0's or dummy data to make the length thereof match the length of the cryptographic key 1104, provided such a workaround does not consume more system resources than is commercially feasible or warranted. Likewise, although not expressly shown, the CRC 1014 and the ECC 1016 generated by the Flash controller may also be stored in an unencrypted form in the Flash memory array.

The auxiliary data 1006 in the example of FIG. 11 may also be passed through and stored in its original pre-processed form without undergoing processing by the encryption module 1102. The main reason for this pass-through is because some or all of the information in the auxiliary data 1006, such as the LBA, may be needed by the Flash controller in an unencrypted form. Nevertheless, in some embodiments, it is also possible to go ahead and encrypt the auxiliary data 1006 (or some portion thereof) as well and then decrypt that data later as needed, provided such an arrangement does not require more system resources than is commercially feasible or warranted. The Flash controller thereafter organizes and arranges the encrypted user data to reflect the structure or layout for an encrypted physical page and writes it to the Flash memory array in the usual manner.

Figure 12:
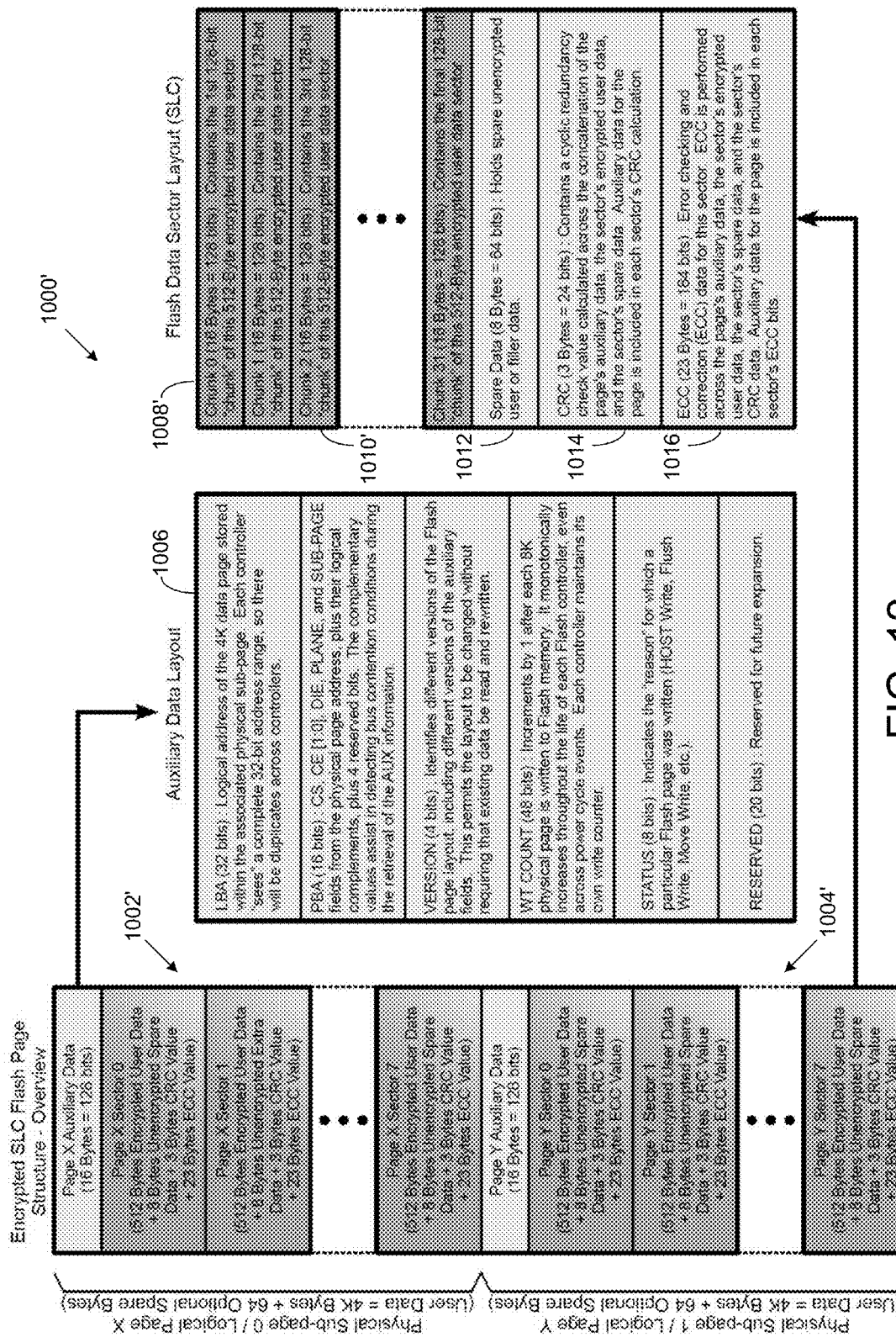
FIG. 12 illustrates an exemplary encrypted physical page structure in accordance with the disclosed embodiments.

FIG. 12 illustrates an exemplary structure or layout for an encrypted physical page 1000' as it may be written to the Flash memory array. As can be seen, the structure or layout for the encrypted physical page 1000' is almost identical to that for the raw or unencrypted physical page 1000 of FIG. 10. That is to say, the encrypted physical page 1000' is divided into physical sub-pages, labeled as physical sub-page 0 (1002') and physical sub-page 1 (1004'), each of which corresponds to a logical page, labeled as logical page X (1002') and logical page Y (1004'), respectively, with each of the logical pages X, Y having 128 bits (16 bytes) of auxiliary data 1006.

Unlike the unencrypted physical page 1000, the 4 KB of user data in the logical pages X, Y of the encrypted physical page 1000' are encrypted. These 4 KB of encrypted user data are divided over eight encrypted sectors 1008', each encrypted sector 1008' having 512 bytes of encrypted user data. The 512 bytes of encrypted user data within each encrypted sector 1008' are further divided into encrypted user data chunks 1010' having 128 bits each by virtue of the 128-bit encryption key 1104 used. The eight bytes of spare data 1012, as mentioned above, are not encrypted, nor are the 3 bytes of CRC 1014 or the 23 bytes of ECC 1016 that are generated by the Flash controller. These 3 bytes of CRC 1014 may contain a cyclic redundancy check value calculated across a concatenation of a logical page's auxiliary data 1006, a sector's encrypted user data, and the sector's spare data. The 23 bytes of ECC 1016 may contain error checking and correction data for the sector and may be determined across the logical page's auxiliary data 1006, the sector's encrypted user data, the data stored in the sector's spare bytes, and the sector's CRC data. As explained earlier, the auxiliary data 1006 for the logical page may be included in each sector's CRC calculation and ECC bits.

Figure 13:
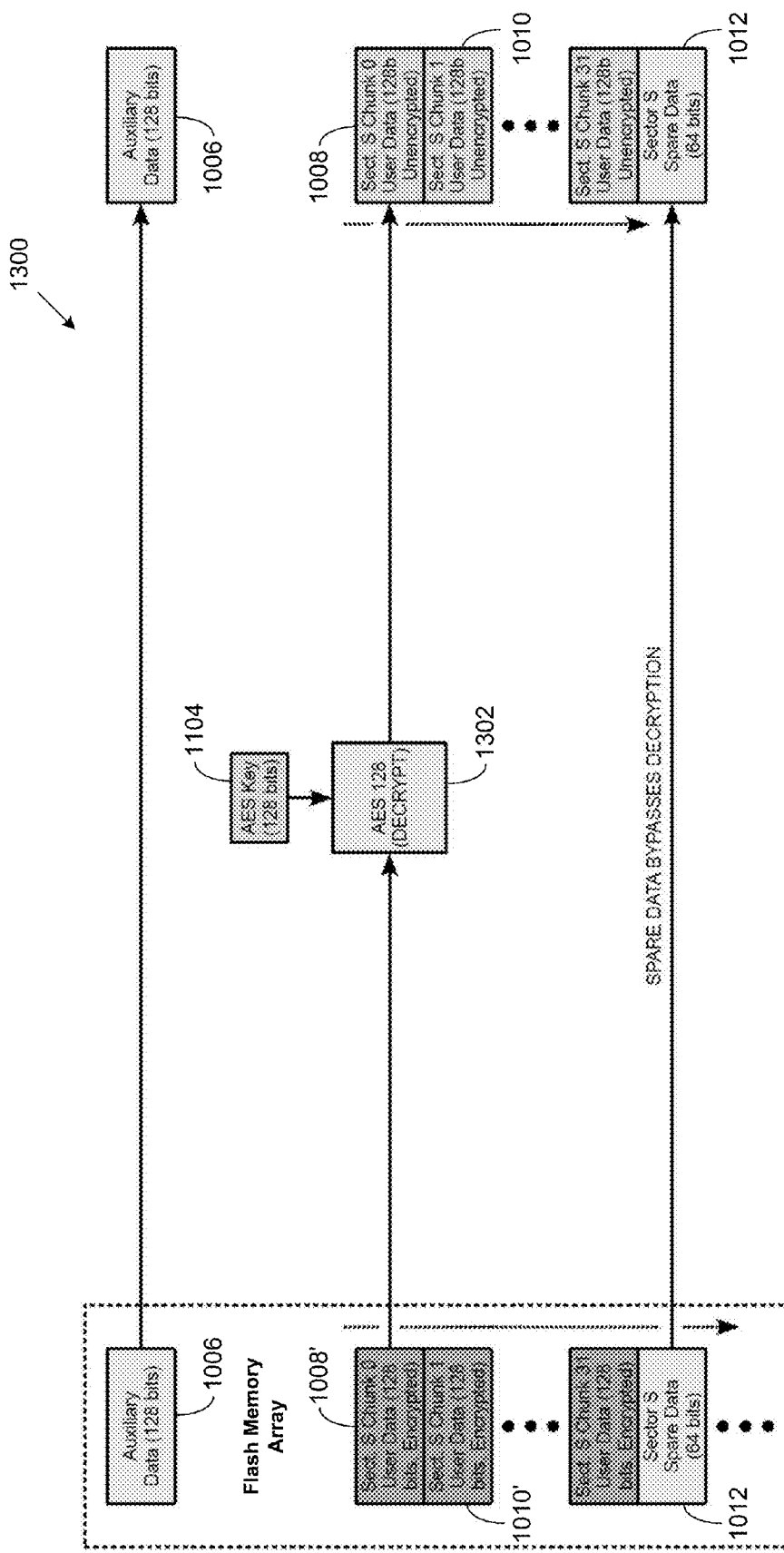
FIG. 13 illustrates an exemplary decryption flow diagram for a Flash memory storage system in accordance with the disclosed embodiments.

FIG. 13 illustrates an exemplary implementation of a decryption scheme in a Flash controller using the above encrypted physical page structure or layout via a flow diagram 1300. The flow decryption diagram 1300 is essentially the reverse of the encryption flow diagram 1100 of FIG. 11 and will be described only briefly here. In general operation, when data needs to be read from the Flash memory array, the Flash controller retrieves the encrypted user data from the Flash memory array in the usual manner.

The encrypted user data is then processed or decrypted one chunk 1010' at a time by a conventional AES-128 decryption module 1302 using the same conventional 128-bit AES cryptographic key 1104 that was used to encrypt the user data. The auxiliary data 1006 and the spare data 1012 are again passed through without processing, and while not expressly shown, the CRC 1014 and ECC 1016 generated by the Flash controller are likewise stored in an encrypted form. The unencrypted user data chunks 1010 are then organized and processed to reflect the structure and layout of the unencrypted physical page 1000 described above, and subsequently provided to the requesting host application in the usual manner.

In some embodiments, in addition to (or instead of) encryption, it may be desirable to pre-process the user data. Such pre-processing may include, for example, scrambling the user data, performing pre-encryption mixing of the user data, or a combination of both. Where both scrambling and pre-encryption mixing of the user data is performed, it should be noted that although the scrambling and pre-encryption mixing are shown (and described) in a particular order, those having ordinary skill in the art will understand that the scrambling and pre-encryption mixing may also be performed in a different order from the one shown.

Scrambling may be desirable, for example, when MLC (Multi-Level Cell) Flash memory is used. As is commonly understood, MLC Flash memory is generally prone to higher error rates due in part to its higher cell density. One way to minimize the high error rate for MLC Flash memory is to randomize the data that is written to the MLC Flash memory, for example, by scrambling the data so that it more closely resembles random or pseudorandom noise. SLC (Single Level Cell) Flash memory may also benefit from scrambling, although the resulting randomization generally has less of an impact on the error rate of SLC Flash memory.

Pre-encryption mixing may be desirable, for example, where identical plaintext blocks are encrypted into identical ciphertext blocks such that any long term patterns or repetitions in the data are susceptible to correlation, resulting in loss or lack of "confidentiality," which is a characteristic of certain encryption modes (e.g., electronic codebook mode) that is well understood by those having ordinary skill in the art. One way to avoid this loss or lack of "confidentiality" is to mix up the data so that not all identical plaintext blocks are encrypted into identical ciphertext blocks.

Figure 14:
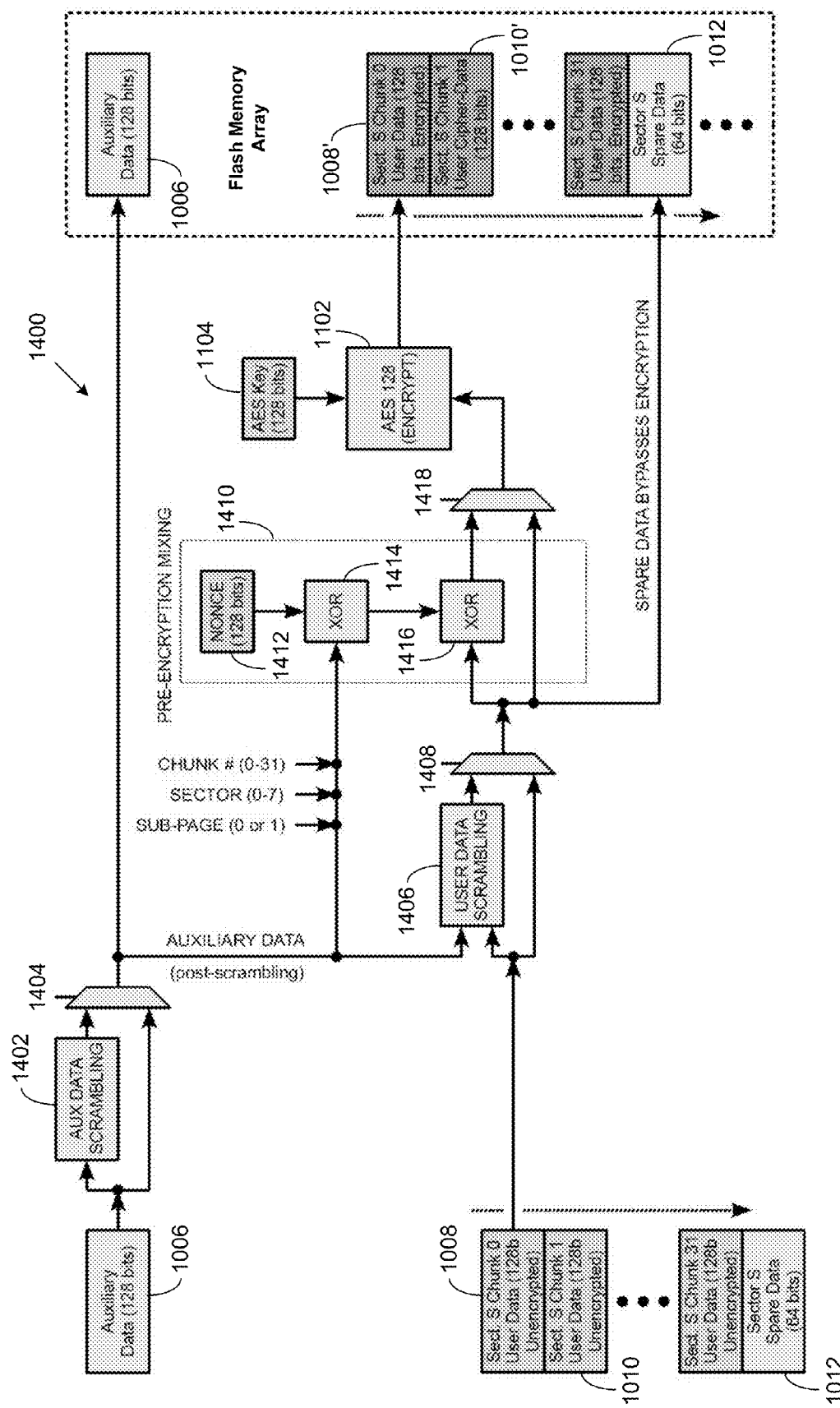
FIG. 14 illustrates an exemplary enhanced encryption flow diagram for a Flash memory storage system in accordance with the disclosed embodiments.

Turning now to FIG. 14, an exemplary implementation of a Flash controller capable of scrambling and pre-encryption mixing user data is illustrated via a flow diagram 1400. The flow diagram 1400 reflects a number of functional options that may be implemented in the Flash controller by selectively programming the Flash controller, which is typically a field programmable gate array (FPGA), with the desired options available. Such selective programming provides the flexibility to choose specific functional options from a plurality of options that may be enabled for the Flash controller prior to compiling the Flash controller program and programming the FPGA. In this way, modifications and customizations of the Flash controller for a particular purpose or application may be made as compile time decisions.

As can be seen in FIG. 14, in some embodiments, scrambling may be implemented in the Flash controller by providing scramblers at the appropriate points in the flow diagram 1400. The scrambling operates generally to randomize the data written to the Flash memory array so that it more closely resembles random or pseudorandom noise. Any suitable scrambling routine may be used, including the scrambling routines previously discussed herein, without departing from the scope of the disclosed embodiments.

In some embodiments, scrambling of the auxiliary data 1006 may be provided as an option. Such scrambling of the auxiliary data 1006, when selected, may involve providing the auxiliary data 1006 to an auxiliary data scrambler 1402. In some embodiments, this auxiliary data scrambler 1402 may provide an invertible transformation that maps each set of auxiliary data to a new set of auxiliary data having random pseudorandom statistical properties. The invertible transformation may involve using the auxiliary data, or a portion thereof, to seed a sequence generator that may then be incremented and used throughout the corresponding sector 1008. Any suitable sequence generator may be used, including the exemplary sequence generator discussed earlier herein, without departing from the scope of the disclosed embodiments. The output from the sequence generator may then be applied to a word (two bytes) or other predefined length of auxiliary data using a bit-by-bit XOR operation to impart the random or pseudorandom statistical properties to the auxiliary data 1006.

The scrambled output of the auxiliary data scrambler 1402 may then be provided to one input of an auxiliary data mux 1404, along with the unscrambled version of the auxiliary data 1006 at another input of the auxiliary data mux 1404. The auxiliary data mux 1404 allows scrambling of the auxiliary data 1006 to be implemented as an option. The option whether to implement scrambling of the auxiliary data 1006 may then be chosen by selecting the appropriate (top) input of the auxiliary data mux 1404, the output from which is stored in the Flash memory array without encryption in the manner described above. Selecting a different (bottom) input of the auxiliary data mux 1404 allows the unscrambled auxiliary data 1006 to be provided at the output of the mux 1404.

Scrambling may also be implemented in the Flash controller for the user data, including the user data chunks 1010 and the spare data 1012, by providing such user data to a user data scrambler 1406. In some embodiments, the user data scrambler 1406 may preferably, but not necessarily, operate in an identical fashion to the auxiliary data scrambler 1402. The scrambled output of the user data scrambler 1406 may then be provided to one input of a user data mux 1408 along with the unscrambled user data itself at another input thereof. The user data mux 1408, like the auxiliary data mux 1404, allows scrambling of the user data to be implemented as an option. The option to scramble the user data may then be selected by selecting the appropriate (top) input of the user data mux 1408, while selecting a different (bottom) input of the user data mux 1408 allows unscrambled user data to be provided at the output of the mux. Typically, if scrambling is enabled for the auxiliary data mux 1404, then scrambling is also enabled for the user data mux 1408, and vice versa.

Referring still to FIG. 14, in some embodiments, pre-encryption mixing may also be offered as an option in the Flash controller together with (or as an alternative to) scrambling. In these embodiments, a pre-encryption mixer 1410 may be provided for mixing the user data prior to encrypting the data. The pre-encryption mixer 1410 operates generally to mix the user data so that identical plaintext blocks are not encrypted into identical ciphertext blocks. Any number of pre-encryption mixing routines may be used for the pre-encryption mixer 1410 without departing from the scope of the disclosed embodiments. For example, in one embodiment, the pre-encryption mixer 1410 may be implemented by performing a mathematical and/or logical operation, such as a bit-by-bit XOR operation, on a 128-bit user-selected "nonce" (number used once) 1412, or other user-selected number, and some or all of the information from the auxiliary data 1006, either scrambled or unscrambled (from the mux 1404). This XOR operation may be performed using an XOR gate 1414 having the nonce 1412 as one input and the auxiliary data 1006 as another input.

In addition (or alternatively) to the auxiliary data 1006, one or more items of information that is unique to each user data chunk 1010 being processed may also be provided as an input to the XOR gate 1414. Such one or more unique items of information may include, for example, the physical sub-page number (e.g., 0, 1) for a given user data chunk 1010, the sector number (e.g., 0-7) for that chunk, and the chunk number (e.g., 0-31) for that chunk. A second mathematical and/or logical operation, such as an XOR operation, may then be performed using the output of the XOR gate 1414 and the user data, either scrambled or unscrambled (from the mux 1408), to achieve the intended mixing of the user data. The second XOR operation may be performed using an XOR gate 1416 having the output of the XOR gate 1414 as one input and the user data as another input. The output of the second XOR gate 1416 may then be provided to one input of a pre-encryption mux 1418 along with the user data, either scrambled or unscrambled, at another input thereof. The option whether to provide pre-encryption mixing of the user data may then be selected by choosing the appropriate (top) input of the pre-encryption mux 1418, while selecting another (bottom) input of the pre-encryption mux 1418 allows the user data to bypass the pre-encryption mixing.

Assuming pre-encryption mixing is enabled, the mixed user data may then be provided to the encryption module 1102 and thereafter encrypted on a chunk-by-chunk basis in the manner described above with respect to FIGS. 10-13. The encrypted data may then be written by the Flash controller to the Flash memory array in the usual manner. Such an arrangement helps ensure that any long-term patterns or repetitions in the user data are not easily correlated, thereby maintaining the confidentiality of the data.

In the above embodiments, the spare data 1012 may also be scrambled together with the various user data chunks 1010 by the user data scrambler 1406. The scrambled spare data 1012 may thereafter undergo pre-encryption mixing along with the user data in the manner described above. However, as shown in the flow diagram 1400, and consistent with the embodiments of FIGS. 10-13, the spare data 1012 need not be written to the Flash memory array in an encrypted form. Instead, the spare data 1012, either scrambled or unscrambled, may bypass any encryption and be written to the Flash memory array in an unencrypted form. Likewise, the auxiliary data 1006, either scrambled or unscrambled, may similarly bypass any encryption and be written to the Flash memory array in an unencrypted form. And although not expressly shown, the CRC and the ECC generated by the Flash controller are also stored unencrypted in the Flash memory array.

Figure 15:
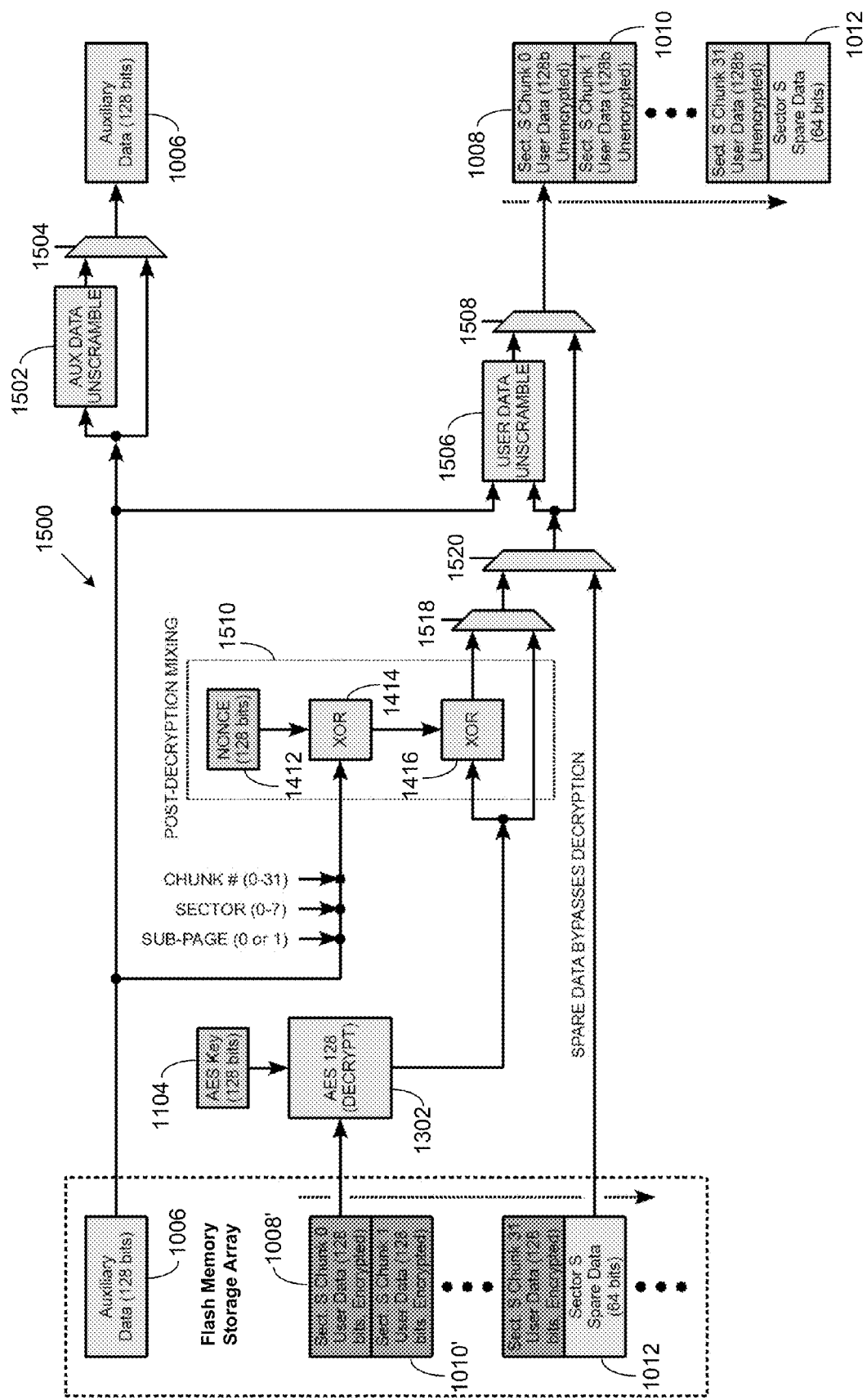
FIG. 15 illustrates an exemplary enhanced decryption flow diagram for a Flash memory storage system in accordance with the disclosed embodiments.

FIG. 15 illustrates a flow diagram 1500 for implementing a Flash controller that is capable of decrypting user data stored in the Flash memory array where such user data has undergone the scrambling, pre-encryption mixing, and/or encryption discussed with respect to FIG. 14. In general, the flow diagram 1500 operates in the reverse order of the encryption flow diagram 1400 in FIG. 14 to return the user data to the form it had prior to encryption, pre-encryption mixing, and/or scrambling. Specifically, encrypted user data stored in the Flash memory array is decrypted one user data chunk 1010' at a time by an AES-128 decryption module 1302 using the same 128-bit AES encryption key 1104 that was used to originally encrypt the data. Where the user data has undergone pre-encryption mixing, in some embodiments, the flow diagram 1500 may also provide post-decryption mixing via a post-decryption mixer 1510 to undo the pre-encryption mixing. The post-decryption mixer 1510 may operate generally to return the user data to its form prior to pre-encryption mixing using the same inputs that were used by pre-encryption mixer 1410 originally to mix the user data. That is to say, the post-decryption mixer 1510 may perform an XOR operation (e.g., via the XOR gate 1414) using the 128-bit nonce 1412 and some or all of the information from the auxiliary data 1006, either scrambled or unscrambled, as inputs.

In some embodiments, in addition to (or instead of) the auxiliary data 1006, the post-decryption mixer 1510 may input the one or more items of information that is unique to each user data chunk 1010 being processed, including the physical sub-page number (e.g., 0, 1) for a given chunk 1010, the sector number (e.g., 0-7) for that chunk, and the chunk number (e.g., 0-31) for the chunk. The post-decryption mixer 1510 may then perform another XOR operation (e.g., via the XOR gate 1416) with the output of the first XOR operation and the decrypted user data (from the decryption module 1302). This returns the user data to the form it had prior to encryption and prior to pre-mixing processing.

Where applicable, unscrambling of the auxiliary data 1006 may also be performed using an auxiliary data unscrambler 1502 and an auxiliary data mux 1504. Likewise, where applicable, unscrambling of the user data may also be performed using a data unscrambler 1506 and a user data mux 1508. And as before, the spare data 1012 that was stored in the Flash memory may bypass any encryption and/or post-decryption processing, as such spare data 1012 was stored in an unencrypted and unmixed form. Likewise, the auxiliary data 1006 may also bypass any encryption and/or post-decryption processing, as such auxiliary data 1006 was also stored in an unencrypted and unmixed form.

Figure 16:
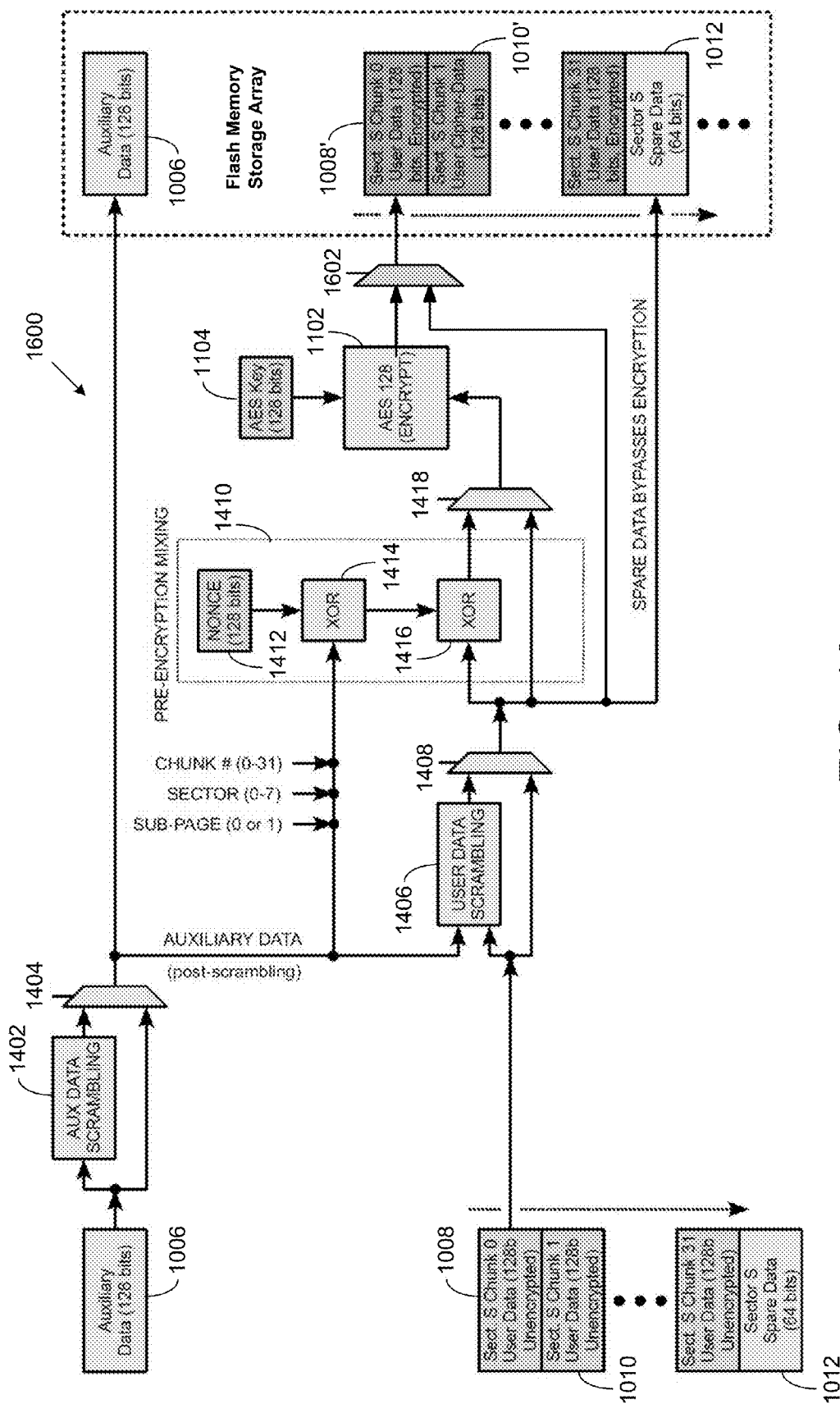
FIG. 16 illustrates an exemplary alternative enhanced encryption flow diagram for a Flash memory storage system in accordance with the disclosed embodiments.

FIG. 16 illustrates another exemplary flow diagram 1600 for implementing a Flash controller capable of scrambling and pre-encryption mixing of user data. The flow diagram here is similar to the flow diagram 1400 of FIG. 14 in all respects except one. In this flow diagram 1600, an option is provided where the Flash controller may be programmed such that the user data bypasses both pre-encryption mixing and encryption. In some embodiments, this option to bypass both pre-encryption mixing and encryption as well may be implemented via a bypass mux 1602 that receives as one input the unencrypted version of the user data, either scrambled or unscrambled. The output of the encryption module 1102 is then provided as another input to the bypass mux 1602. Thus, by selecting the appropriate (bottom) input of the bypass mux 1602, a Flash controller may be implemented where both pre-encryption mixing and encryption are skipped.

Aspects of the inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements.

What is claimed is:

1. A method of preserving confidentiality in a Flash-based storage system, comprising:
   receiving data from an external host to be written to the Flash-based storage system;
   writing the data to a plurality of Flash memory chips in the Flash-based storage system, the data being written to the Flash memory chips in the form of page stripes, each page stripe comprising a number of data pages, each data page of a page stripe being written to a different Flash memory chip from other data pages of the page stripe;
   for data having identical data pages, preserving a confidentiality of the data, the confidentiality preventing the identical data pages from being correlated, the preserving comprising mixing the data pages of the page stripe being written to the Flash memory chips, the mixing comprising performing a mathematical and/or logical operation on the data pages so that identical data pages appear different from one another after encryption; and
   encrypting the mixed data pages of the page stripe being written to the Flash memory chips.

2. The method of claim 1, further comprising scrambling the data pages of the page stripe being written to the Flash memory chips, the scrambling comprising performing an invertible transformation on the data pages of the page stripe that imparts pseudorandom property to the data pages, and encrypting the scrambled data pages of the page stripe being written to the Flash memory chips.

3. The method of claim 2, further comprising generating data protection pages for the encrypted data pages of the page stripes and storing the data protection pages in the Flash memory chips without scrambling, mixing, or encrypting the data protection pages.

4. The method of claim 2, wherein the data pages of the page stripe include auxiliary data, further comprising storing the auxiliary data in the Flash memory chips without scrambling, mixing, or encrypting the auxiliary data.

5. The method of claim 4, wherein the invertible transformation includes seeding a sequence generator with at least a portion of the auxiliary data and using an output of the sequence generator to perform an Exclusive-OR (XOR) operation with the data pages.

6. The method of claim 4, wherein the mathematical and/or logical operation includes performing an Exclusive-OR (XOR) operation using at least a portion of the auxiliary data and a user-selected number.

7. The method of claim 6, wherein the mathematical and/or logical operation further includes performing an Exclusive-OR (XOR) operation using the results of the Exclusive-OR (XOR) operation in claim 6 and the scrambled data pages of the page stripe.

8. A computer-readable medium having computer-readable instructions stored thereon for causing a Flash controller to preserve confidentiality in a Flash-based storage system, the computer-readable instructions comprising instructions for causing the Flash controller to:
   receive data from an external host for storing in the Flash-based storage system;
   write the data to a plurality of Flash memory chips in the Flash-based storage system in the form of page stripes, each page stripe comprising a number of data pages, each data page of a page stripe being written to a different Flash memory chip from other data pages of the page stripe;
   for data having identical data pages, preserve a confidentiality of the data, the confidentiality preventing the identical data pages from being correlated, the preserving comprising mixing the data pages of the page stripe being written to the Flash memory chips, the mixing comprising performing a mathematical and/or logical operation on the data pages so that identical data pages appear different from one another after encryption; and
   encrypt the mixed data pages of the page stripe being written to the Flash memory chips.

9. The computer-readable medium of claim 8, wherein the computer-readable instructions further comprise instructions for causing the Flash controller to scramble the data pages of the page stripe being written to the Flash memory chips, the scrambling comprising performing an invertible transformation on the data pages of the page stripe that imparts pseudorandom property to the data pages, and encrypt the scrambled data pages of the page stripe being written to the Flash memory chips.

10. The computer-readable medium of claim 9, wherein the computer-readable instructions further comprise instructions for causing the Flash controller to generate data protection pages for the encrypted data pages of the page stripes and store the data protection pages in the Flash memory chips without scrambling, mixing, or encrypting the data protection pages.

11. The computer-readable medium of claim 9, wherein the data pages of the page stripe include auxiliary data, the computer-readable instructions further comprising instructions for causing the Flash controller to store the auxiliary data in the Flash memory chips without scrambling, mixing, or encrypting the auxiliary data.

12. The computer-readable medium of claim 11, wherein the invertible transformation includes seeding a sequence generator with at least a portion of the auxiliary data and using an output of the sequence generator to perform an Exclusive-OR (XOR) operation with the data pages.

13. The computer-readable medium of claim 11, wherein the mathematical and/or logical operation includes performing an Exclusive-OR (XOR) operation using at least a portion of the auxiliary data and a user-selected number.

14. The computer-readable medium of claim 13, wherein the mathematical and/or logical operation further includes performing an Exclusive-OR (XOR) operation using the results of the Exclusive-OR (XOR) operation in claim 13 and the scrambled data pages of the page stripe.

15. A system controller for a Flash memory storage system, comprising:
   a nonvolatile memory; and
   programmable circuitry connected to the nonvolatile memory, the programmable circuitry being programmed to:
      receive data from an external host for storing in the Flash-based storage system;
      write the data to a plurality of Flash memory chips in the Flash-based storage system in the form of page stripes, each page stripe comprising a number of data pages, each data page of a page stripe being written to a different Flash memory chip from other data pages of the page stripe;
      for data having identical data pages, preserve a confidentiality of the data, the confidentiality preventing the identical data pages from being correlated, the preserving comprising mixing the data pages of the page stripe being written to the Flash memory chips, the mixing comprising performing a mathematical and/or logical operation on the data pages so that identical data pages appear different from one another after encryption; and encrypt the mixed data pages of the page stripe being written to the Flash memory chips.

16. The system controller of claim 15, wherein the programmable circuitry is further programmed to scramble the data pages of the page stripe being written to the Flash memory chips, the scrambling comprising performing an invertible transformation on the data pages of the page stripe that imparts pseudorandom property to the data pages, and encrypt the scrambled data pages of the page stripe being written to the Flash memory chips.

17. The system controller of claim 16, wherein the programmable circuitry is further programmed to generate data protection pages for the encrypted data pages of the page stripes and store the data protection pages in the Flash memory chips without scrambling, mixing, or encrypting the data protection pages.

18. The system controller of claim 16, wherein the data pages of the page stripe include auxiliary data, the programmable circuitry being further programmed to store the auxiliary data in the Flash memory chips without scrambling, mixing, or encrypting the auxiliary data.

19. The system controller of claim 18, wherein the invertible transformation includes seeding a sequence generator with at least a portion of the auxiliary data and using an output of the sequence generator to perform an Exclusive-OR (XOR) operation with the data pages.

20. The system controller of claim 18, wherein the mathematical and/or logical operation includes performing an Exclusive-OR (XOR) operation using at least a portion of the auxiliary data and a user-selected number to produce an output, and performing an Exclusive-OR (XOR) operation using the output and the scrambled data pages of the page stripe.

* * * * *